(12) United States Patent
Sasaki et al.

(10) Patent No.: US 8,450,678 B2
(45) Date of Patent: May 28, 2013

(54) SENSOR FOR USE WITH AUTOMATIC DOOR HAVING A SETTING UNIT FOR SETTING WHETHER OR NOT EACH LIGHT EMITER SHOULD EMIT LIGHT

(75) Inventors: Shigeaki Sasaki, Kobe (JP); Takashi Wada, Kobe (JP); Kenji Nishigaki, Kobe (JP)

(73) Assignee: Nabtesco Corporation, Tokyo (JP)

( * ) Notice: Subject to any disclaimer, the term of this patent is extended or adjusted under 35 U.S.C. 154(b) by 349 days.

(21) Appl. No.: 12/918,411

(22) PCT Filed: Mar. 17, 2009

(86) PCT No.: PCT/JP2009/055127
§ 371 (c)(1), (2), (4) Date: Aug. 19, 2010

(87) PCT Pub. No.: WO2009/116515
PCT Pub. Date: Sep. 24, 2009

(65) Prior Publication Data
US 2010/0321676 A1    Dec. 23, 2010

(30) Foreign Application Priority Data

Mar. 19, 2008 (JP) .................................. 2008-71147
Apr. 22, 2008 (JP) .................................. 2008-111287

(51) Int. Cl.
*H01J 40/14* (2006.01)

(52) U.S. Cl.
USPC ........................................ 250/221; 250/239

(58) Field of Classification Search
USPC ... 250/221, 559.4, 214 R, 239, 205; 340/516, 340/545.1–545.3
See application file for complete search history.

(56) References Cited

U.S. PATENT DOCUMENTS

| 7,009,168 B2 * | 3/2006 | Matsuyama et al. ........... 250/221 |
| 8,258,455 B2 * | 9/2012 | Kakuyama et al. ............. 250/221 |
| 2010/0024302 A1 | 2/2010 | Kakuyama et al. |

FOREIGN PATENT DOCUMENTS

| JP | 64-33684 U | 3/1989 |
| JP | 3004867 U | 11/1994 |
| JP | 2000-304869 | 11/2000 |
| JP | 2001-295547 | 10/2001 |
| JP | 2003-027835 | 1/2003 |
| JP | 2007-271537 | 10/2007 |
| WO | WO2008050565 A1 | 5/2008 |

OTHER PUBLICATIONS

International Search Report dated May 8, 2009 in corresponding International Application No. JP2009/055127.
Office Action received in corresponding Japanese Application No. JP2008-71147, Mar. 2013.
Office Action received in corresponding Japanese Application No. JP2008-111287, Mar. 2013.

* cited by examiner

*Primary Examiner* — Que T Le
(74) *Attorney, Agent, or Firm* — Duane Morris LLP

(57) ABSTRACT

An automatic door sensor includes light-emitters that cyclically emit and project light, and lenses that deflect emitted light in the direction perpendicular to a door opening. Light-receivers receive the projected light through segmented lenses. For each of the light-emitters, a setting unit sets therein whether each light-emitter should emit light. A control unit judges whether a human or an object is present in a surveillance area based on how the light-receivers receive light.

16 Claims, 20 Drawing Sheets

Example of Set Information (Light Emission Control)

| Emitter 14a | Non-Emission |
| --- | --- |
| Emitter 14b | Emission |
| Emitter 14c | Emission |
| Emitter 14a | Non-Emission |

Fig 8b

Example of set information (Light—Reception)

| | |
| --- | --- |
| Value from Receiver 22a1 when Emitter 14a Emits Light | Nonuse |
| Value from Receiver 22a2 when Emitter 14a Emits Light | Nonuse |
| Value from Receiver 22a3 when Emitter 14a Emits Light | Nonuse |

●
●
●

| | |
| --- | --- |
| Value from Receiver 22a7 when Emitter 14a Emits Light | Nonuse |
| Value from Receiver 22a8 when Emitter 14a Emits Light | Nonuse |
| Value from Receiver 22a9 when Emitter 14a Emits Light | Nonuse |

●
●
●

| | |
| --- | --- |
| Value from Receiver 22b7 when Emitter 14a Emits Light | Nonuse |
| Value from Receiver 22b8 when Emitter 14a Emits Light | Nonuse |
| Value from Receiver 22b9 when Emitter 14a Emits Light | Nonuse |

Fig 8c

Example of Set Information (Light Emission Control)

| Emitter 14a | Emission |
| --- | --- |
| Emitter 14b | Emission |
| Emitter 14c | Emission |
| Emitter 14a | Emission |

Fig 8d

Example of set information (Light—Reception)

| | |
| --- | --- |
| Value from Receiver 22a1 when Emitter 14a Emits Light | Use |
| Value from Receiver 22a2 when Emitter 14a Emits Light | Nonuse |
| Value from Receiver 22a3 when Emitter 14a Emits Light | Nonuse |

●
●
●

| | |
| --- | --- |
| Value from Receiver 22a7 when Emitter 14a Emits Light | Use |
| Value from Receiver 22a8 when Emitter 14a Emits Light | Nonuse |
| Value from Receiver 22a9 when Emitter 14a Emits Light | Nonuse |

●
●
●

| | |
| --- | --- |
| Value from Receiver 22b7 when Emitter 14a Emits Light | Use |
| Value from Receiver 22b8 when Emitter 14a Emits Light | Nonuse |
| Value from Receiver 22b9 when Emitter 14a Emits Light | Nonuse |

SENSOR FOR USE WITH AUTOMATIC DOOR HAVING A SETTING UNIT FOR SETTING WHETHER OR NOT EACH LIGHT EMITER SHOULD EMIT LIGHT

TECHNICAL FIELD

Incorporated by reference in this application are Japanese Patent Application No. 2008-71147 filed on Mar. 19, 2008, Japanese Patent Application No. 2008-111287 filed on Apr. 22, 2008, Japanese Patent Application No. 2008-112498 filed on Apr. 23, 2008, Japanese Patent Application No. 2008-117259 filed on Apr. 28, 2008, and Japanese Patent Application No. 2008-124541 filed on May 12, 2008.

The present invention relates to a sensor for use with an automatic door and, more particularly, to such sensor employing light-emitters and light-receivers.

BACKGROUND ART

Some sensors for use with an automatic door employing light-emitters and light-receivers survey a surveillance area with a large number of light spots by means of a small number of light-emitter and light receivers. For example, an automatic door sensor disclosed in Patent Literature 1 employs a segmented lens through which light from light-emitters is projected onto different locations in a surveillance area, and light reflected from these locations are condensed through another segmented lens onto light-receivers. According to Patent Literature 2, two light-emitters are disposed side by side, being spaced from each other by a distance larger than the distance between the centers of two lens segments of a two-segmented lens. The two light-emitters are so disposed that light from the two light-emitters can pass through the centers of the two lens segments, respectively, whereby the light is projected onto locations on opposite sides of an imaginary center line passing through the midpoint between the two light-emitters. A surveillance area is formed in front of an opening of the automatic door. In order to avoid unnecessary opening and closing of the automatic door, it is necessary for the width dimension of the surveillance area in the direction along the width of the opening to be adjusted depending on the width of the door opening and the height at which the sensor is mounted. The adjustment is made in Patent Literature 1 by disposing a light-blocking member on a portion of the segmented lens for the light-emitters through which light would otherwise be projected in an undesired direction and by disposing a light-blocking member on a portion of the segmented lens for the light-receivers through which reflected light from an undesired direction would otherwise be condensed. According to the technology of Patent Literature 2, that one of the light-emitters which can project light in one of the two sides of the imaginary center line to which it is not desired to project light is turned off to thereby turn off the surveillance area. A sensor disclosed in Patent Literature 3 includes a number of light-emitting devices, i.e. light-emitters, arranged in a matrix so that light can be projected to form a matrix in a surveillance area, and a number of light-receiving devices, i.e. light-receivers, disposed in a matrix to correspond to the respective ones of the light-emitters so that the light-receivers can receive light the respective corresponding light-emitters project onto the surveillance area. A row of light-emitters is caused to emit light, and a row of light-receivers including those corresponding to desired ones of the light-emitters in the row is caused to receive light, to thereby make it possible to detect a human body or the like at a desired location.

Patent Literature 1: JP3004867U
Patent Literature 2: JP2000-304869A
Patent Literature 3: JP2007-271537A

DISCLOSURE OF THE INVENTION

Problem to be Solved by the Invention

According to the technology of Patent Literature 1, it is necessary to mount light-blocking members, which requires time and work for their assemblage and installation. Also, according to the technology of Patent Literature 2, it is only possible to turn off the surveillance area on one side of the imaginary center line, but it is not possible to finely adjust and set the surveillance area. According to the technology of Patent Literature 3, a large number of light-emitters and light-receivers must be used to cover the whole surveillance area, resulting in increase of the costs. Also, it is necessary to make complicated control of the respective light-emitters and light-receivers if it is desired to detect a human body or an article present only in a desired region in the surveillance area. It is difficult to freely set the surveillance area as desired.

An objet of the present invention is to provide a sensor for use with an automatic door, which is low in cost, can be still easily assembled and installed, and provide a surveillance area that can be freely set as desired.

Solution to Problem

According to an embodiment of the present invention, a sensor for use with an automatic door includes a light-emitting unit and a light-receiving unit. The light-emitting unit includes a plurality of light-emitters cyclically projecting light toward a surveillance area near the door. An optical device causes light projected from the light-emitters to be deflected in the direction along the width of a door opening and in the direction perpendicular to the direction along the width of the door opening. The light-receiving unit includes a light-receiver which receives light projected onto the surveillance area. A segmented lens condenses the light projected onto the surveillance area onto the light-receiver. The segmented lens is a lens which includes a combination of plural lens segments. A setting unit is set to determine whether each of the light-emitters is to emit light or not. A control unit judges whether a human or an object is present or not within the surveillance area based on how the light-receiver receives the light.

In this automatic door sensor, light from a plurality of light-emitters is deflected by the optical device in the direction perpendicular to the width of the door opening so that the light is projected to different locations along the width direction of the door opening in the surveillance area. Light, e.g. reflected light, from these locations is received through the respective lens segments of the segmented lens by the light-receiver. The control unit judges whether or not any human or object is present based on how the light-receiver receives the light. Actually, only a light-emitter which the setting unit sets emitting light emits light. Thus, it is possible to monitor only a particular area along the width direction of the door opening. It is possible to form the surveillance area in a fine manner in accordance with the width of the door opening and the height at which the sensor is mounted, by a simple work of determining, through the setting unit, which light-emitter should be made to emit light.

A plurality of such light-receivers may be disposed at least in the direction along the width of the door opening. Whether or not the way how a particular light-receiver receives light should be used or not in determining the presence of a human or object in the surveillance area is set in a setting unit in accordance with the way how each the light-emitter emits light. With this arrangement, since a plurality of light-receivers are used, the number of light-emitters emitting light to be received by the light-receivers can be smaller, and it is possible to form the surveillance area in a fine manner in accordance with the width of the door opening and the height at which the sensor is installed. Furthermore, since a judgment whether or not a human or object is present is not made based on the way how any light-receiver which would receive light from a light-emitter emitting no light, erroneous detection can be prevented.

Three or more such light-receivers may be used. With this arrangement, the region onto which each light-emitter should emits light can be smaller, which makes it possible to finely set the surveillance area.

A blocking plate may be disposed between adjacent light-emitters. With this arrangement, incidence on the optical device of light other than the light intended to be incident can be prevented. In other words, projection of light other than light intended to be projected through the optical device can be prevented, which makes it possible to form a definite surveillance area.

A plurality of light-receivers may be arranged at least in the direction along the width of the door opening and in the direction perpendicular to the width of the door opening. With this arrangement, the surveillance area can be formed finely also in the direction perpendicular to the width of the door opening.

The optical device for the light-emitting unit may be one of a cylindrical lens, a toric lens, an optical system using hologram, a slit, and a reflection-type mirror. With such optical device, light from a light emitter can be efficiently projected onto a desired location in the surveillance area.

In the above-described case, a plurality of light-receiving units may be used. In such case, areas of the surveillance area the light-receiving units monitor are arranged in the direction perpendicular to the width of the door opening. With this arrangement, a sufficient surveillance area can be secured in the direction perpendicular to the width of the door opening, without resort to mounting the sensor at a high position.

In the described cases, a plurality of light-receivers may be arranged at least in the direction along the width of the door opening. The light-emitting unit is disposed in such a manner that the plural light-emitters can project light within the light-receiving width for the segments of said segmented lens. With this arrangement, light emitted from a plurality of light-emitters, for example, and reflected from different surveillance areas can be received by a single light-receiver, whereby the areas can be set finely in the direction along the width of the door opening, in accordance with the width of the door opening and the height at which the sensor is mounted.

A sensor for use with an automatic door according to another embodiment of the present invention also includes a light-emitting unit and a light-receiving unit. The light-emitting unit includes a light-emitter to emit light for projection to a surveillance area near the door, and a segmented lens including a combination of a plurality of lenses so arranged to diffuse the light from the light-emitter over the surveillance area. The light-receiving unit includes a plurality of light-receivers receiving light projected onto the surveillance area, and a plurality of lenses which condense those portions of light projected onto the surveillance area which advance in the direction along the width of a door opening and in the direction perpendicular to the width of the door opening, onto the light-receivers. A setting unit is set to determine whether a judgment about the presence of a human or object in the surveillance area based on how the light-receiving unit receives light should be made or not. In accordance with the setting made in the setting unit, a control unit makes a judgment, based on how the light-receiver receives light, as to whether a human or object is present in the surveillance area.

According to this embodiment, different from the afore-described embodiment, a segmented lens is used in association with the light-emitting unit. The remaining structure is the same as that of the aforementioned embodiment. Thus, like the aforementioned embodiment, by a simple work of determining, through the setting unit, which light-emitters should be made to emit light, the surveillance area can be formed in a fine manner in accordance with the width of the door opening and the height at which the sensor is mounted. It should be noted that, in this embodiment, too, modifications made in the aforementioned embodiment can be made.

A sensor for use with an automatic door according to still another embodiment also includes a light-emitting unit and a light-receiving unit. The light-emitting unit includes a plurality of light-emitters cyclically emitting and projecting light onto a surveillance area near the door. An optical device causes light emitted by the light-emitters to be deflected in the direction along the width of a door opening or in the direction perpendicular to the width of the door opening. The light-receiving unit includes light-receivers which receive light projected onto the surveillance area. The light-receivers are one-dimensionally or two-dimensionally arranged. Also, a segmented lens is disposed to condense light projected onto the surveillance area onto the light-receivers. The segmented lens is a lens including a plurality of lenses arranged in the direction perpendicular to the direction in which the emitted light is deflected. Whether a judgment about the presence of a human or object in the surveillance area based on the way how the respective light-receivers receive light should be made or not is set in a setting unit. In accordance with the setting in the setting unit, a control unit makes a judgment as to whether a human or object is present in the surveillance area based on how the light-receivers receive light.

With this automatic door sensor arrangement, light from a plurality if light-emitter is deflected by the optical device in the direction along the width of the door opening and in the direction perpendicular to the width of the door opening, to thereby projected onto different locations in the direction along the width of the door opening and in the direction perpendicular to the width of the door opening. Light, e.g. reflected light, from these locations is received by the light-receivers disposed in a one-dimensional or two-dimensional pattern through the respective lens segments of the segmented lens. Like this, it is not necessary to use a number of light-emitters and light-receivers in a one-to-one relationship, which results in lowering the cost of sensors for use with an automatic door. The control unit judges whether there is a human or object based on how the respective light-receivers receive light. Actually, whether or not a human or object is present in the surveillance area is judged from the output of the light receiver, which the setting unit sets, based on the way how the respective light-emitters emit light, as the light-receiver to be used in judging the presence of a human or an object in the surveillance area. Thus, the surveillance area can be determined freely so as to monitor, for example, only a particular location along the door opening.

A blocking plate may be disposed between adjacent ones of the light-emitters. With this arrangement, incidence on the optical device of light other than the light intended can be prevented. In other words, projection of light other than light intended to be projected from the optical device can be prevented, which makes it possible to form a definite surveillance area.

The optical device for the light-emitting unit may be one of a cylindrical lens, a toric lens, an optical system using hologram, a slit, and a reflection-type mirror. With such optical device, light from a light emitter can be efficiently projected onto a desired location in the surveillance area.

A plurality of light-receiving units may be used. In such case, areas in the surveillance area the respective light-receiving units monitor are arranged in the direction perpendicular to the width of the door opening. With this arrangement, a sufficient surveillance area can be secured in the direction perpendicular to the width of the door opening, without resort to mounting the sensor at a high position.

At least one of the light-receiving units may be movable. This arrangement makes it possible to expand the surveillance area in the direction perpendicular to the width of the door opening.

In addition to it, a plurality of light-emitting units may be used to make it possible to vary the light-projecting area in the direction perpendicular to the width of the door opening. This arrangement makes it possible to further expand the surveillance area in the direction perpendicular to the width of the door opening.

A sensor for use with an automatic door according to a further embodiment also includes a light-emitting unit and a light-receiving unit. The light-emitting unit includes a plurality of one-dimensionally or two-dimensionally arranged light-emitters which emit and project light onto a surveillance area near the door. The light-emitting unit includes also a segmented lens including a plurality of lenses combined in such a manner as to disperse the light emitted by the light-emitters, toward the surveillance area, in the direction along the width of a door opening or in the direction perpendicular to the width of the door opening. The light-receiving unit includes a plurality of light-receivers which receive light projected onto the surveillance area. The light-receiving unit also includes a plurality of optical devices which condense, onto the light-receivers, those portions of the light projected onto the surveillance area which advance in the direction perpendicular to the direction in which the light is diffused. Whether a judgment about the presence of a human or an object, based on how the respective light-receivers receive light, should be made or not is set in a setting unit in accordance with the way how the respective light-emitters emit light. A control unit makes a judgment as to whether a human or object is present in the surveillance area based on the way how the light-receivers receive light.

Different from the previous embodiment, a segmented lens is disposed in the light-emitting unit. The remaining arrangement is the same as in the previous embodiment, and, therefore the sensor can be manufactured at a lower cost like the sensor of the previous embodiment. In addition, by a simple work of setting, in the setting unit, the light-receivers the received-light representative signals from which should be used to judge whether or not a human or the like is present, the surveillance area can be freely set. It should be noted that modifications described with reference to the aforementioned embodiments can be made to this embodiment.

BRIEF DESCRIPTION OF DRAWINGS

FIG. 1b shows how the sensor according to the first embodiment is used with an automatic door different from the one shown in FIG. 1a.

FIG. 2a is a front view of the sensor of FIG. 1a.

FIG. 5b shows a detecting area modified by the sensor of FIG. 1 from the one shown in FIG. 5a.

FIG. 5c shows a detecting area further modified by the sensor of FIG. 1 from the one shown in FIG. 5a.

FIG. 8a shows settings for light-emitters set through a setting unit of the sensor of FIG. 1.

FIG. 8b shows settings for light-receivers set through the setting unit of the sensor of FIG. 1.

FIG. 8c shows settings for light-emitters set through the setting unit of the sensor of FIG. 1 different from the settings shown in FIG. 8a.

FIG. 8d shows settings for light-emitters set through the setting unit of the sensor of FIG. 1 different from the settings shown in FIG. 8b.

EMBODIMENTS TO PUT INVENTION INTO PRACTICE

Figure 1A:
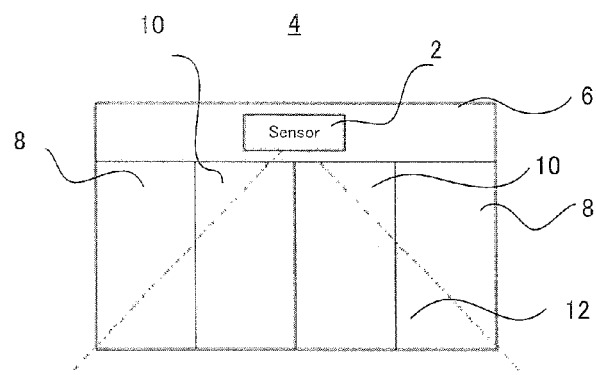
FIG. 1a shows how a sensor for use with an automatic door according to a first embodiment of the present invention is used with an automatic door.
Figure 1B:
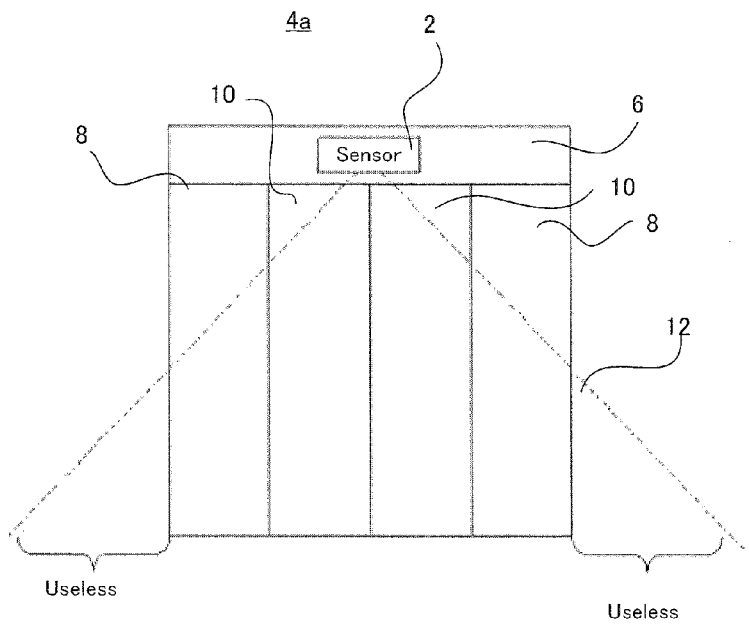

An automatic door sensor 2 according to a first embodiment of the present invention is mounted on a lintel 6 of an automatic door 4 or 4a, as shown in FIG. 1a or 1b. The automatic doors 4 and 4a are of the same structure except their heights. The automatic door 4 or 4a is for opening and closing a door opening formed between fixed walls 8, 8 spaced from each other, by means of door panels 10, 10 moved in opposite directions. The width of the door opening of the automatic doors 4 and 4a are the same, but the height of the automatic door 4a is larger. If, for example, the automatic door sensor 2 having its detecting range 12 so set as to detect a human or object present between the outer edges of the fixed walls 8, 8, as shown in FIG. 1a, is installed on the automatic door 4a shown in FIG. 1b, the detecting range 12 extends outside the fixed walls 8, 8 of the automatic door 4a, and, therefore, a human or object outside the fixed walls 8, 8, which need not be detected, may be detected. In such case, the detecting range 12 should be narrowed to an effective range. The automatic door sensor 2 is so arranged that adjustment of the detecting range 12 can be made with ease.

Figure 2A:
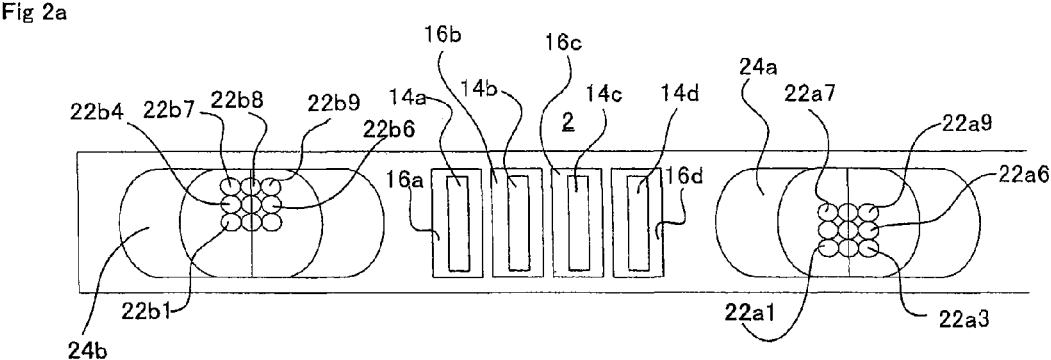
Figure 2B:
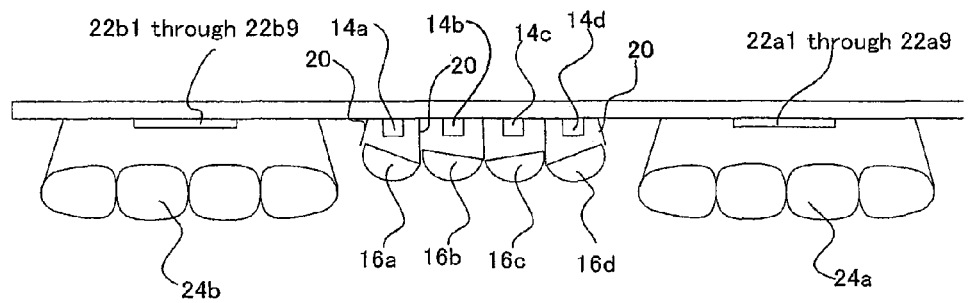
FIG. 2b is a plan view of the sensor of FIG. 1b.

As shown in FIGS. 2a and 2b, the automatic door sensor 2 includes a plurality, e.g. four, of light-emitters 14a through 14d disposed in its center portion. The light-emitters 14a-14d emit, for example, pulsated infra-red light at a predetermined frequency. The light-emitters 14a-14d are disposed, being spaced at predetermined intervals, in the direction along the width of the door opening. The light-emitters 14a-14d of a planar shape having given lengths in the direction along the width of the door opening and the direction perpendicular to the width of the door opening, with the length in the direction perpendicular to the width of the door opening being larger than the length in the direction along the width of the door opening. Each of the light-emitters 14a-14d emits light from its entire planar surface. One light-emitting member may be used to provide surface light-emission, or a plurality of light-emitting members having a smaller diameter arranged in matrix may be used to provide surface light-emission.

Figure 3:
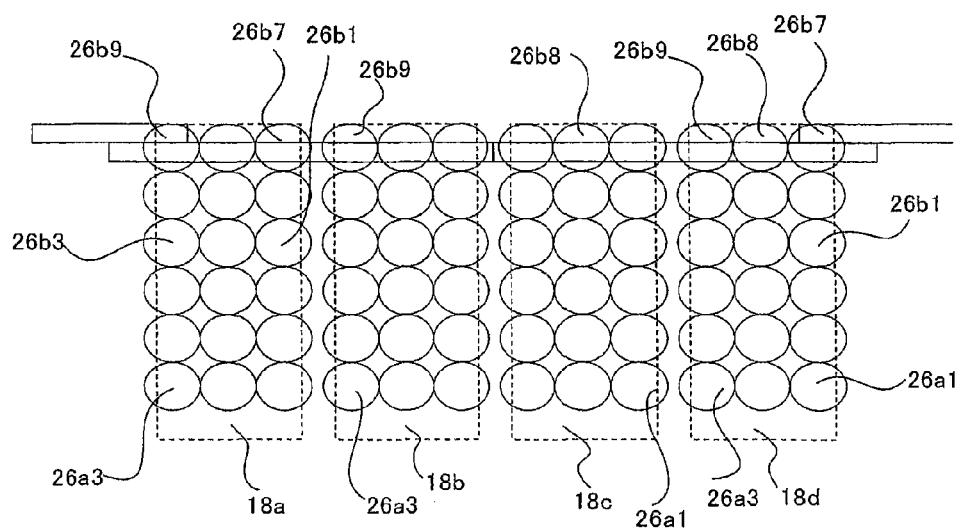
FIG. 3 shows a detecting area formed by the sensor of FIG. 1.

In front of the respective light-emitters 14a-14d, plural, e.g. four, lenses 16a through 16d as optical devices, corresponding in number to the light-emitters used, are disposed. The lenses 16a-16d may be cylindrical lenses, for example, and are disposed with their optical axes disposed at different angles relative to the direction along the width of the door opening. As a result, as shown in FIG. 3, four projected-light regions 18a through 18d, in the shape of, for example, rectangle, are formed by light from the light-emitters 14a-14d on a reference plane, e.g. a floor surface. These projected-light regions 18a-18d are formed, being arranged in the direction along the width of the door opening, and being perpendicular to the direction along the height of the door panels 10, 10 and also to the direction along the width of the door opening.

As the optical devices, toric lenses may be used. Alternatively, optical systems formed of a surface-relief hologram pattern for scattering light through refraction provided by randomly disposed surface structures at the micron level may be used as the optical devices. Such surface structures exhibit the same effects as a micro concave lens array. By the use of such optical devices, the automatic door sensor 2 can be formed thin. Another alternative is the use of high-intensity infrared light-emitting devices as the light-emitters 14a-14d, together with slits, as the optical devices, which restrict the angles at which and locations to which light is projected. With this arrangement, the light-emitters 14a-14d can be inexpensive. Instead of using the lenses 16a-16d, concave reflective mirrors may be used, being disposed in the rear of the light-emitters 14a-14d. This arrangement facilitates the formation of complicated regions to which light is projected.

As shown in FIG. 2b, a light-blocking plate 20 is disposed between the light-emitters 14a and 14b, between the light-emitters 14b and 14c, between the light-emitters 14c and 14d, and on the outside of each of the outermost two light-emitters 14a and 14d. The light-blocking plates 20 prevent incidence of light from the light-emitters 14a-14d onto other lenses 16a-16d than the respective associated ones, to thereby prevent erroneous operation.

The light-emitters 14a-14d and the lenses 16a-16d form a light-emitting unit.

Light-receivers are disposed on opposite sides, in the direction along the width of the door opening, of the light-emitting unit. On the right side in FIG. 2a, light-receivers 22a1-22a9, nine in total, are arranged in a 3×3 matrix, namely, three in the direction along the width of the door opening and three in the direction perpendicular to the width of the door opening, e.g. in the direction along the height of the door panels 10, 10 in case that the sensor is installed on the lintel as shown in FIG. 2a, and these light-emitters 22a1-22a9 are disposed closer to the door in the direction perpendicular to the width of the door opening. Similarly, on the left side in FIG. 2a, a 3×3 matrix of light-receivers 22b1-22b9, nine in total, is disposed, being vertically displaced, i.e. being remote from the door in case that the sensor is mounted on the lintel, so that the received-light regions do not overlap. The light-receivers on the opposite sides of the light-emitters 14a-14d are vertically displaced, i.e. in the direction along the height of the door panels 10, 10 in case that the sensor is mounted on the lintel, so that the received-light regions from which they receive light do not overlap with each other. In place of displacing the light-receivers relative to each other, the positions and angles of the lenses may be displaced.

In front of the right-side light-receivers 22a1-22a9 and the left-side light-receivers 22b1-22b9, respective segmented lenses 24a and 24b are disposed. The segmented lenses 24a and 24b condense light from different locations along the width of the door opening onto the same light-receiver. The segmented lenses 24a and 24b are each segmented into four in the direction along the width of the door opening so as to correspond to the aforementioned projected-light regions 18a-18d, and focus light reflected from the projected-light regions 18a-18d onto corresponding ones of the light-receivers 22a1-22a9 and 22b1-22b9. Circles shown in the respective projected-light regions 18a-18d in FIG. 3 are received-light regions on the floor from which reflected light to be received by the light-receivers 22a1-22a9 and 22b1-22b9 originates. The received-light regions are in the projected-light regions 18a-18d and include nine, in total, received-light regions 26a1-26a9 arranged in a matrix which are located remote from the door opening in correspondence with the light-receivers 22a1-22a9, and nine, in total, received-light regions 26b1-26b9 arranged in a matrix which are located nearer to the door opening in correspondence with the light-receivers 22b1-22b9.

The light-receivers 22a1-22a9 and the segmented lens 24a form one light-receiving unit, and the light-receivers 22b1-22b9 and the segmented lens 24b form one light-receiving unit.

The numbers of the light-emitters and light-receivers in the light-emitting unit and the light-receiving units are not in one-to-one correspondence, but the light-receivers 22a1-22a9 and 22b1-22b9 are larger in number than the light-emitters 14a-14d.

Figure 4:
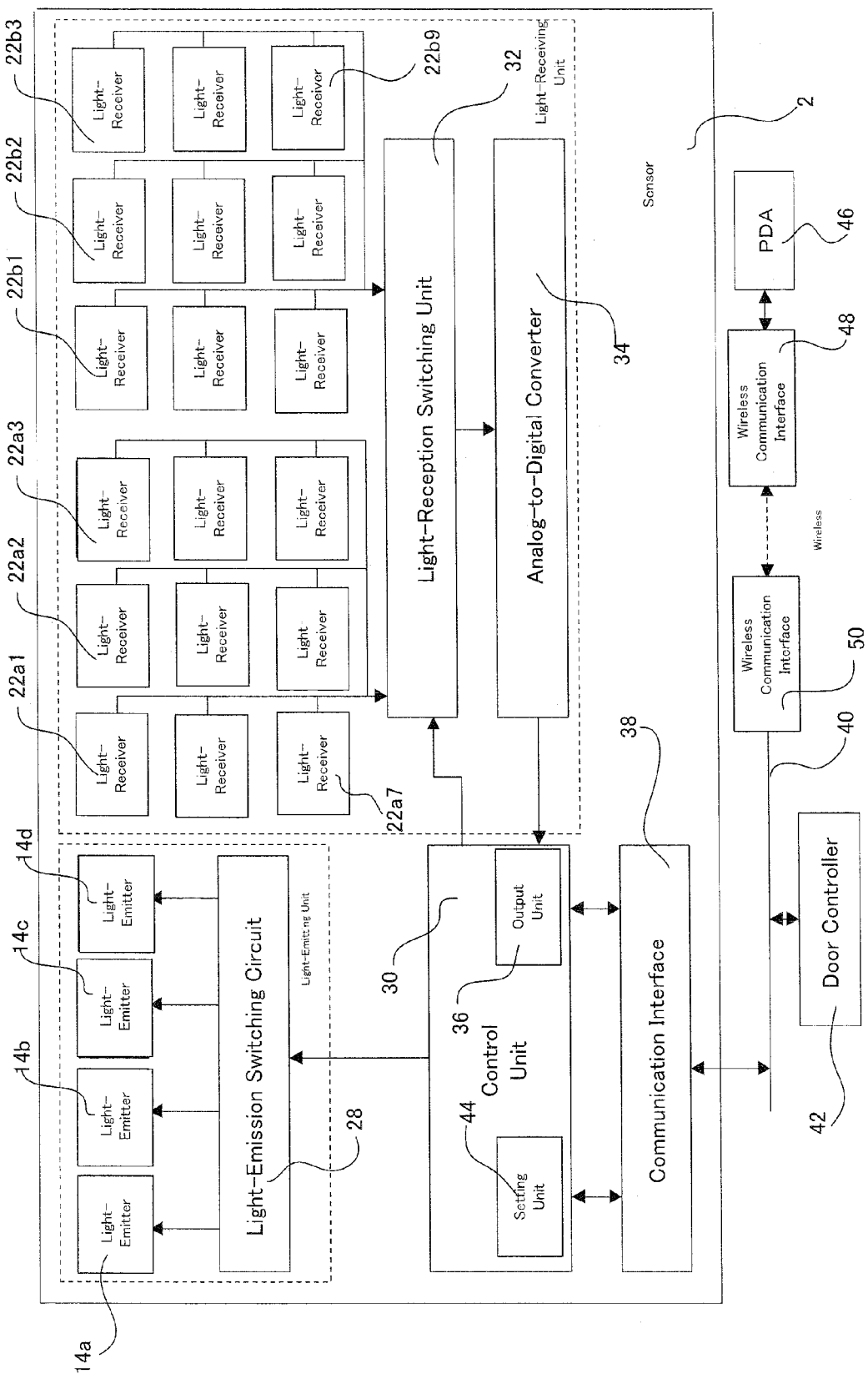
FIG. 4 is a block diagram of the sensor of FIG. 1.

As shown in FIG. 4, one of the light-emitters 14a-14d that receives a light-emission command signal from a light-emission switching unit 28 emits light. The light-emission switching unit 28 may be arranged to repeat cyclical supply of the light-emission command signal successively to all of the light-emitters 14a-14d, or to repeat cyclical supply of the light-emission command signal successively to selected ones of the light-emitters 14a-14d. The light-emission switching unit 28 provides such light-emission command signal in accordance with an instruction from a control unit 30.

The light-receivers 22a1-22a9 and 22b1-22b9 receive light from the corresponding ones of the received-light regions 26a1-26a9 and 26b1-26b9 each time one of the light-emitters 14a-14d emits light, and produce received-light information in the form of a received-light signal. The received-light information from the selected ones of the light-receivers 22a1-22a9 and 22b1-22b9 selected by a light-reception switching unit 32 is converted to digital received-light information in an analog-to-digital converter 34, which is, then, applied to the control unit 30. In accordance with an instruction from the control unit 30, the light-reception switching unit 32 repeatedly selects the received-light information from all of the light-receivers 22a1-22a9 and 22b1-22b9 successively, when any one of the light-emitters 14a-14d is emitting light.

The control unit 30 compares digital received-light information which has been determined to be selected from the information supplied thereto from the analog-to-digital converter 34 with a preset threshold value, and judges from the result of comparison whether or not any human or object is present in the received-light regions 26a1-26a9 and 26b1-26b9 corresponding to that digital received-light information.

The judgment result is supplied to a door controller 42 through an output unit 36 in the control unit 36, a communication interface 38 and a bus 40. The door controller 42 opens or closes the door panels 10, 10 in accordance with the judgment result. The bus 40 may be formed of, for example, a CAN (Controller Area Network).

As described above, the control unit 30 gives an instruction to the light-emission switching unit 28, and this instruction is based on the content set in a setting unit 44 in the control unit 30. Only the digital received-light information selected is compared with the threshold, and the digital received-light information to be selected is also set in the setting unit 44. Furthermore, the above-described threshold value is also set in the setting unit 44. These are set in the setting unit 44 from a portable control unit, e.g. a PDA 46, operated by a user, through wireless communication interfaces 48 and 50, the bus 40 and the communications interface 38.

Figure 5A:
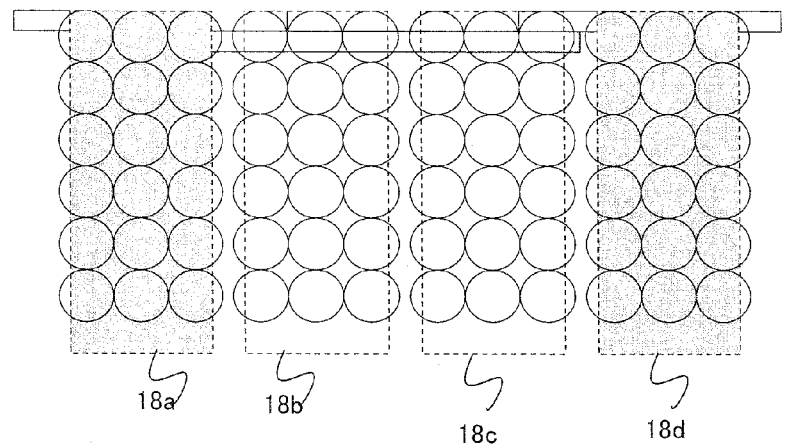
FIG. 5a shows a detecting area set by the sensor of FIG. 1.
Figure 5B:
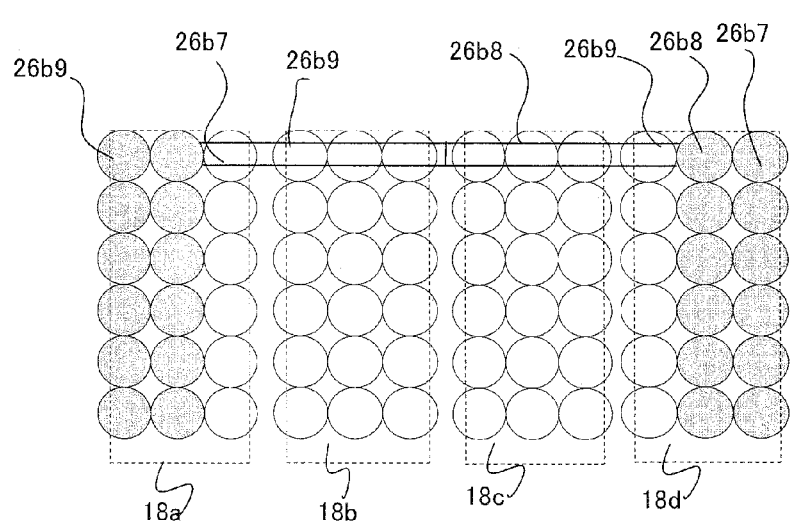
Figure 5C:
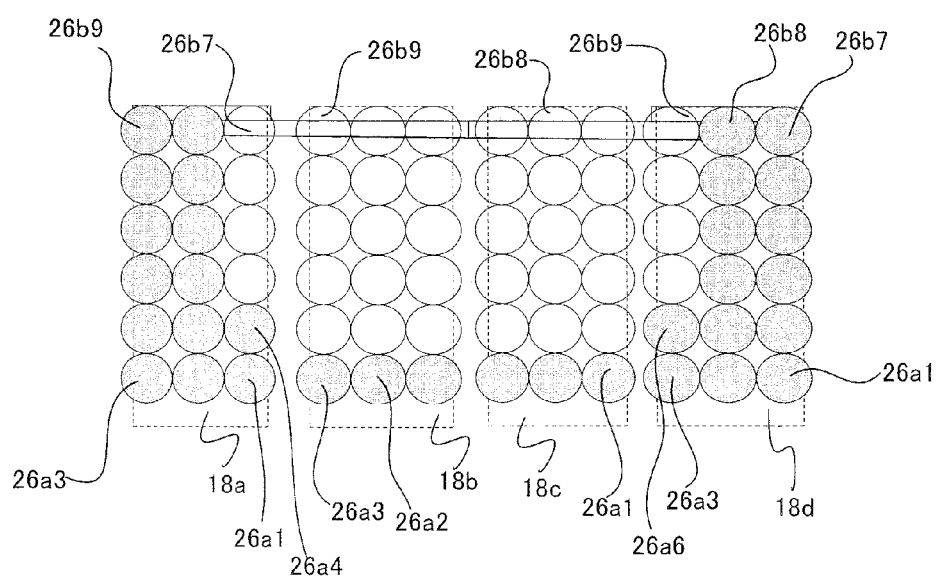

FIGS. 5a, 5b and 5c illustrate how the projected-light regions 18a-18d, and the received-light region 26a1-26a9 and 26b1-26b9 change depending on the settings in the setting unit 44. FIG. 5a illustrates a case in which, for example, the surveillance in the direction along the width of the door opening can be done by means of the projected-light regions 18b and 18c and the received-light regions therein. In this case, no light-emission instruction is given to the light-emitters 14a and 14d in order to prevent light from being projected onto the projected-light regions 18a and 18d. In addition, in order to remove influences which could be cased by external disturbances, the setting unit 44 may be so set that received-light information produced by the light-receivers 22a1-22a9 and 22b1-22b9 in correspondence to the received-light regions within the projected-light regions 18a and 18b are not compared with the threshold value. Instead of preventing the received-light information from being compared with the threshold value, the light-receivers may be arranged not to receive light. FIG. 5a is for an automatic door having a larger height like the one shown in FIG. 1b.

FIG. 5b illustrates the automatic door sensor 2 used with an automatic door having a door opening wider than or having a height somewhat smaller than the automatic door shown in FIG. 5a. In this case, in order for the projected-light regions 18a-18d to be formed, a light-emission command is given to all of the light-emitters 14a-14d. In this case, however, setting is made in the setting unit 44 such that the received-light information from those ones of the light-receivers which receive light from the ones of the received-light regions located within the projected-light regions 18a and 18d but located outward of the door opening, (which are part of the light-receivers 22a1-22a9 and 22b1-22b9 while the light-emitters 14a and 14d are emitting light), is not compared with the threshold value. Instead of arranging for the received-light information not to be compared with the threshold value, such light-receivers may be arranged not to receive light.

In FIG. 5c, setting is made in the setting unit 44 such that received-light information from the two received-light regions 26a1 and 26a4 in the projected-light region 18a, which are located on the side close to the projected-light region 18b and remote from the door opening, received-light information from the received-light regions 26a1-26a3 in each of the projected-light regions 18b and 18c, which are remotest from the door opening, and the received-light information from the two received-light regions 26a3 and 26a6 in the projected-light region 18d, which are located on the side close to the projected-light region 18c and remote from the door opening, in addition to the received-light information from those received-light regions in FIG. 5b, is not compared with the threshold value. Instead of preventing the comparison with the threshold value, light-reception can be prevented. This setting is to deal with a particular condition of the passage to the door panels 10, 10.

Figure 6:
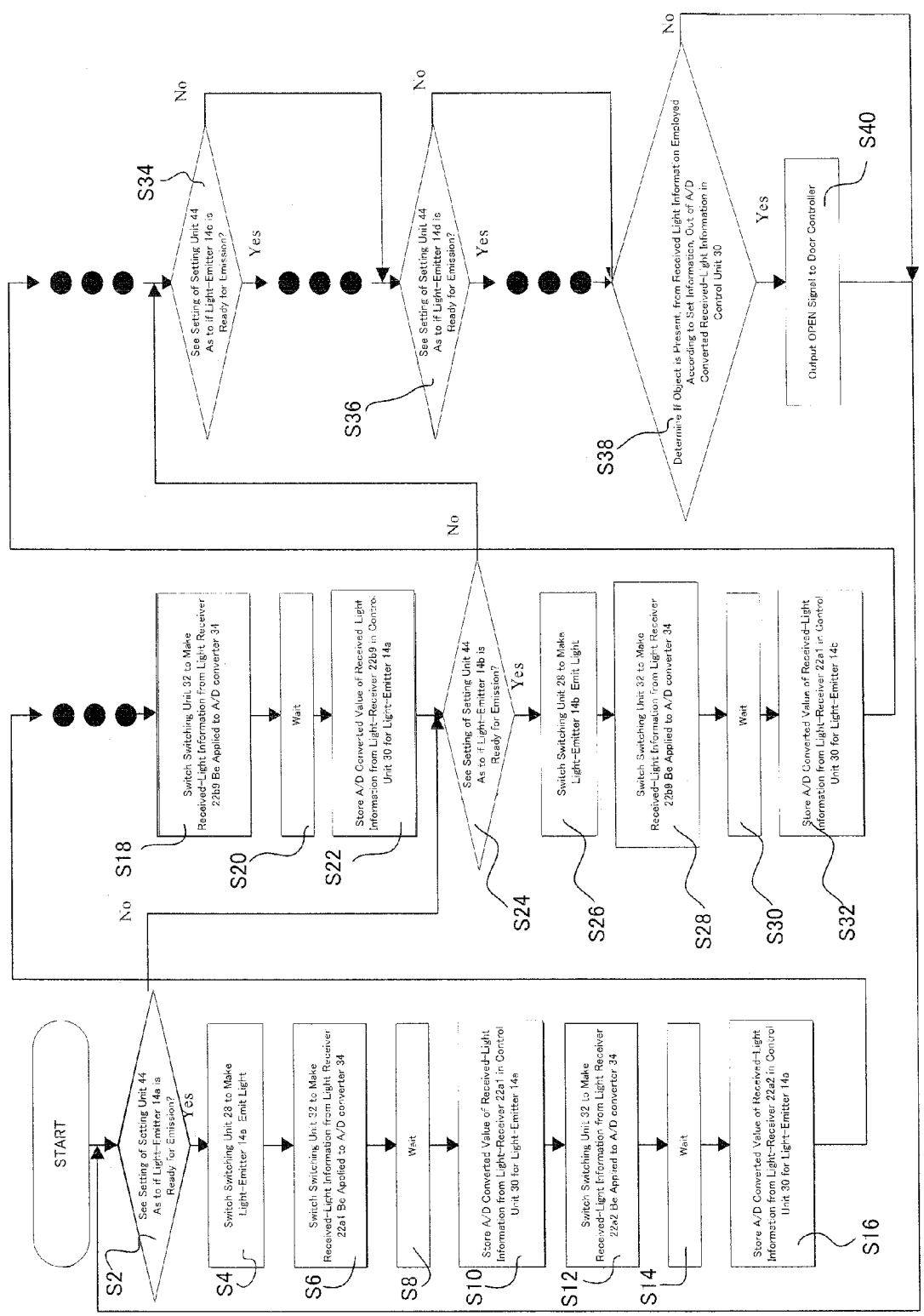
FIG. 6 is a flow chart relating to light emission and light reception in the sensor of FIG. 1.

FIG. 6 is a flow chart illustrating how the control unit 30 controls the light-emitters 14a-14d and the light-receivers 22a1-22a9 and 22b1-22b9, and how the control unit 30 judges the presence or absence of a human or object in accordance with the above-described settings in the setting unit 44.

First, the control unit 30 sees the settings in the setting unit 44 to judge whether the emission of light by the light-emitter 14a has been commanded (Step S2). If the answer to the query is YES, the light-emission switching unit 28 is instructed to switch to make the light-emitter 14a emit light (Step S4). Next, the light-reception switching unit 32 is switched to make the received-light information from the light-receiver 22a1 be inputted to the analog-to-digital converter 34 (Step S6). Waiting is done for a time period in which the received-light information may become stable or, in other words, in which influence of switching noise may disappear (Step S8), and the value resulting from the analog-to-digital conversion of the received-light information from the light-receiver 22a1 is stored in the control unit 30 as the value for the light-emitter 14a (Step S10) Next, the light-reception switching unit 32 is switched to make the received-light information from the light-receiver 22a2 be inputted to the analog-to-digital converter 34 (Step S12). Waiting is done for a time period in which the received-light information may become stable, i.e. in which influence of switching noise may disappear (Step S14), and the value resulting from the analog-to-digital conversion of the received-light information from the light-receiver 22a2 is stored in the control unit 30 as the value for the light-emitter 14a (Step S16). In a similar manner, the received-light information from the respective light-receivers 22a3-22b8 is stored in the control unit 30 as the value corresponding to the light-emitter 14a. After that, in a manner similar to Steps S6, S8 and S10, the switching of the light-reception switching unit 32 (Step S18), the waiting (Step S20) and the storage (Step S22) are carried out for the light-receiver 22b9.

Subsequent to Step S22, or when the answer to the query made in Step S2 is NO, it is judged whether the light-emitter 14b is ordered to emit light (Step S24). Thus, if the answer to the query in Step S2 is NO, the above-described Steps S4 through S22 are not executed, and, therefore, no received-light information regarding the projected-light region 18b is collected.

If the answer to the query in Step S24 is YES, the light-emission switching unit 28 is ordered to make the light-emitter 14b emit light (Step S26). Next, the light-reception switching unit 32 is switched to make the received-light information from the light-receiver 22a1 be applied to the analog-to-digital converter 34 (Step S28). Waiting is done for a time period in which the received-light information may become stable, or in which influence of switching noise may disappear (Step S30), and the value resulting from the analog-to-digital conversion of the received-light information from the light-receiver 22a1 is stored in the control unit 30 as the value for the light-emitter 14b (Step S32). In a similar manner, the received-light information from the light-receivers 22a2 through 22b9 is successively stored in the control unit 30 as the information for the light-emitter 14b.

After storing the received-light information from the light-receiver 22b9 in the control unit 30 as the information for the light-emitter 14b, or if the answer to the query in Step S24 is NO, it is judged whether or not the light-emitter 14c is ordered to emit light (Step S34). If the answer is YES, in a manner similar to the one described above, the received-light information from the light-receivers 22a1 through 22b9 is stored successively in the control unit 30 as the information associated with the light-emitter 14c. Subsequent to that, or in case the answer to the query made in Step S34 is NO, it is judged whether the light-emitter 14d is ordered to emit light or not (Step S36). If the answer to this query is YES, the received-light information from the respective light-receivers 22a1-22b9 is successively stored in the control unit 30 as the information for the light-emitter 14d, in a similar manner to the one described above.

After the received-light information from the light-receiver 22b9 is stored in the control unit 30 as the information for the light-emitter 14d, or if the answer to the query made in Step S36 is NO, the received-light information, out of the digital received-light information stored in the control unit 30, as chosen according to the set information set in the setting unit 44, is compared with the threshold value to determined whether an object or the like is present (Step S38). If the judgment is YES, an OPEN signal to open the door is supplied to the door controller 42 (Step S40). This causes the door panels to be opened, and the execution of processing starts again from Step S2. If the judgment made in Step S38 is negative, the execution of processing starts again from Step S2, too.

Figure 7:
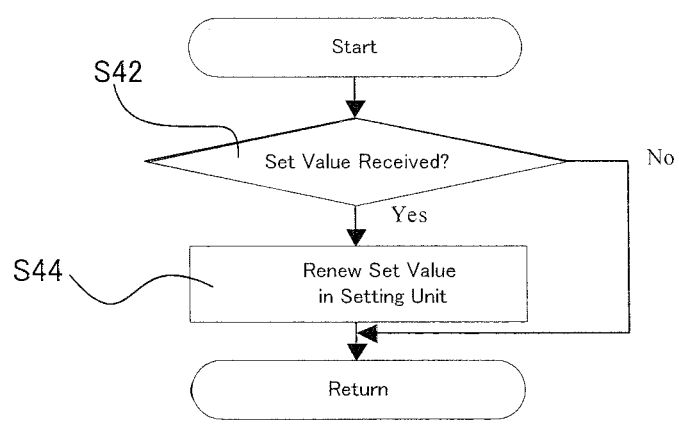
FIG. 7 is a flow chart relating to the setting in the sensor of FIG. 1.
Figure 9A:
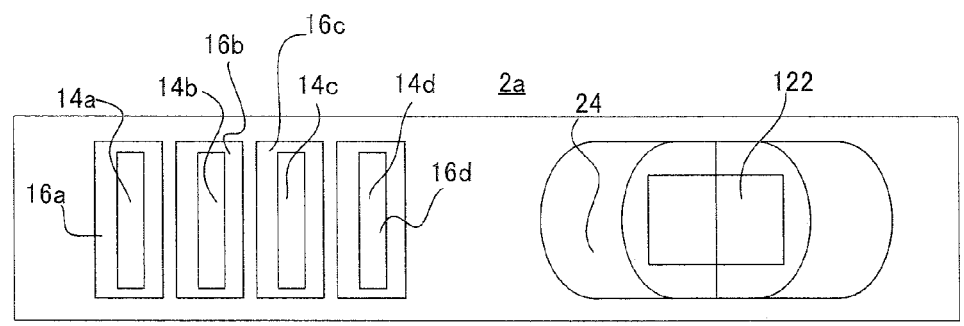
FIG. 9a is a front view of a sensor for use with an automatic door according to a second embodiment of the present invention.
Figure 9B:
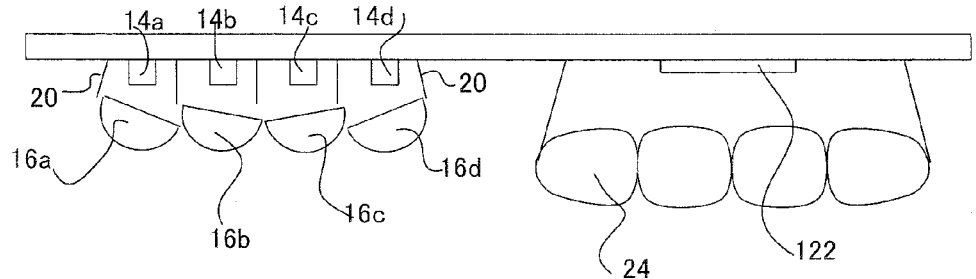
FIG. 9b is a plan view of the sensor according to the second embodiment of the present invention.

FIG. 7 shows, in a flow chart form, the processing executed by the control unit 30 when it receives data from the PDA 46, in which it is judged if a set value, or data, is received (Step S42), and, if the answer is YES, the set value in the setting unit 44 is renewed (Step S44). Then, the processing is ended. When the judgment made in Step S42 is NO, the processing is also ended.

FIGS. 8a, 8b, 8c and 8d schematically illustrate the set values set in the setting unit 44. FIGS. 8a and 8c are for the light-emitters 14a-14d and show "emission" and "non-emission" set in the setting unit 44. FIGS. 8b and 8d show part of the set values for the light-emitters 22a1-22b9, i.e. the set values relating to the light-emitter 14a, which indicate "use" or "nonuse" of the received-light information. The values for the other light-emitters 14b through 14d are also set, but they are not shown. FIGS. 8a and 8b shows the set values for the case shown in FIG. 5a, and FIGS. 8c and 8d shows the set values for the case shown in FIG. 5b.

As described above, in this automatic door sensor 2, by setting the setting unit 44 as desired, it is possible to determine which light-emitter should be caused to emit light and which received-light information from the light-receivers should be used to judge whether a human or object is present, and, accordingly, the sensor 2 can be used readily with automatic doors of different heights as illustrated in FIGS. 5a and 5b or can readily be used with a desired passage as illustrated in FIG. 5c. Also, the number of the light-emitters and the number of the light-receivers used in the sensor 2 need not be equal. The number of the light-emitters can be smaller in the described automatic door sensor 2, which results in reduction in cost. Furthermore, since the light-emitters 14a-14d are arranged to emit light cyclically, the respective light-receivers, even if they are arranged to receive light from plural regions through the segmented lenses 24a and 24b, never receive light from regions onto which light is not projected. Accordingly, in comparison with ordinary automatic door sensors employing segmented lenses, it has an improved S/N ratio. Further, since the emitted light is deflected by the lenses 16a-16d, the projected-light regions 18a-18d receive a sufficient amount of light, which results further improvement of the S/N ratio.

A sensor 2a for use with an automatic door according to a second embodiment is shown in FIGS. 9a through 11. As is seen from FIGS. 9a and 9b, the light-emitting unit of the automatic door sensor 2a is the same as that of the automatic door sensor 2 of the first embodiment, which includes the light-emitters 14a-14d and the lenses 16a-16d. Only one light-receiving unit is used, including a single light-receiver 122 having a larger area than the light-receivers 22a1-22a9 and 22b1-22b9 of the automatic door sensor 2a of the first embodiment.

Figure 10:
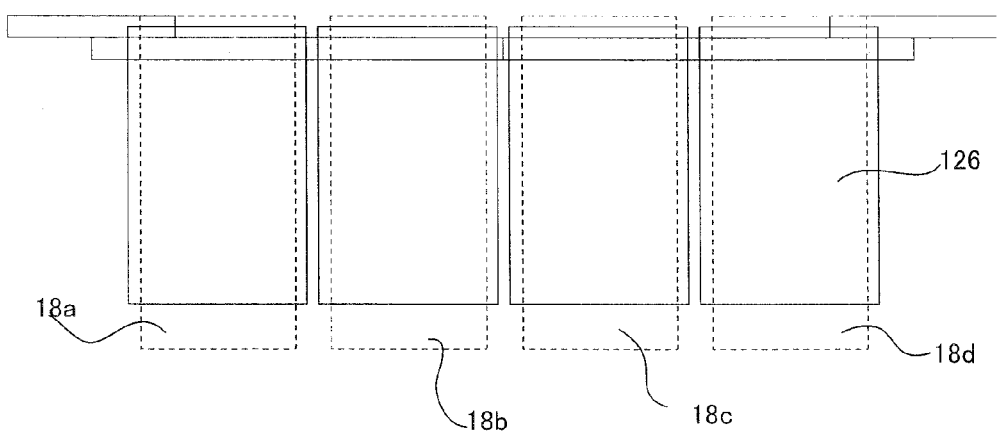
FIG. 10 shows a detecting area formed by the sensor of FIG. 9.

Accordingly, while the projected-light regions 18a-18d same as the ones formed in the automatic door sensor 2 are formed, as shown in FIG. 10, one large received-light region 126 is formed for each of the projected-light regions 18a-18d. The remaining arrangement is similar to that of the automatic door sensor 2, and, therefore its detailed description is not given.

Figure 11:
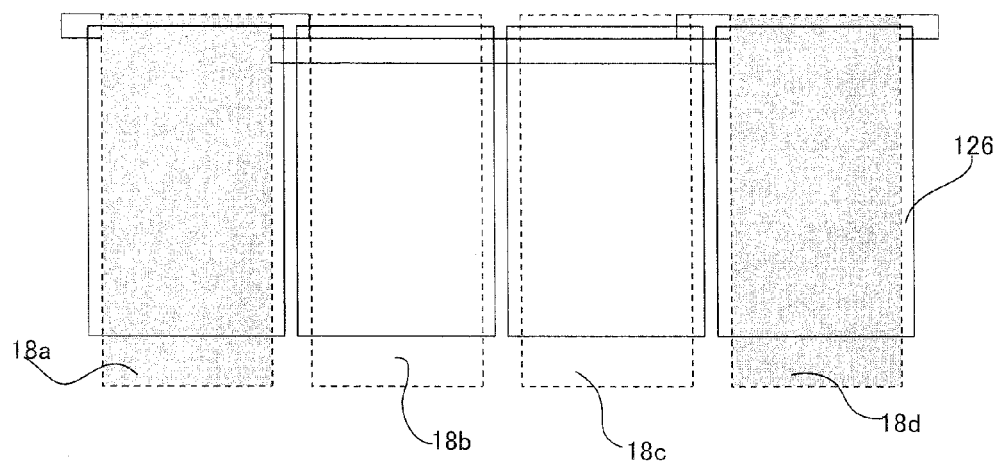
FIG. 11 shows a detecting area modified by the sensor of FIG. 9.

If this automatic door sensor 2a is installed on an automatic door shown in FIG. 11 which is different from the one of FIG. 10, detection of a human or object may become unnecessary on opposite outer sides. In such case, the setting unit 44 is set to inhibit the light-emitters 14a and 14d from emitting light so that no light is projected onto the projected-light regions 18a and 18d. In the processing done by the control unit 30, it is judged in Step S2 shown in FIG. 6 as to if the light-emitter 14a is ordered to emit light. If the answer is YES, the light-emission switching unit 28 is ordered, in Step S4, to switch to make the light-emitter 14a emit light. Then, after storing a value resulting from A/D conversion of received-light information from the light-receiver 122 in the control unit 30, as the value for the light-emitter 14a, a judgment as to if the light-emitter 14b is ordered to emit light is made in Step S24. After that, similar processing is carried out for the other light-emitters 14b-14d. Then, out of the digital received-light information stored in the control unit 30 for the respective light-emitters 14a-14d, the received-light information chosen by the setting unit 44, i.e. the received-light information for the light-emitters 14b and 14d in case of FIG. 11, is used to judge whether any human or object is present.

Figure 12A:
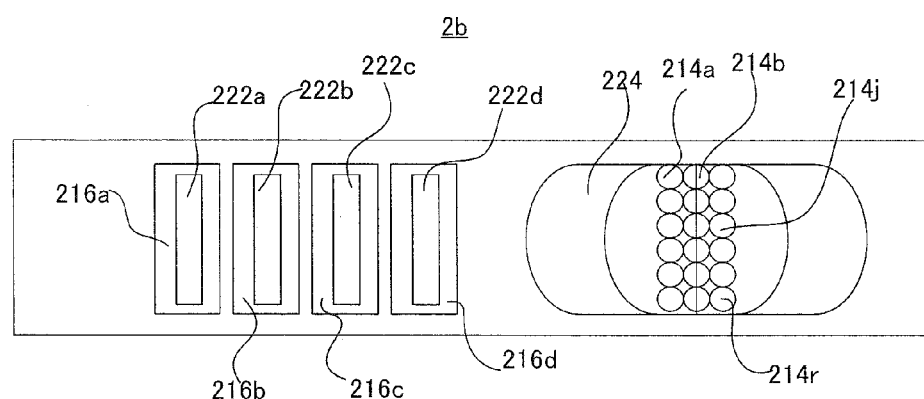
FIG. 12a is a front view of a sensor for use with an automatic door according to a third embodiment of the present invention.
Figure 12B:
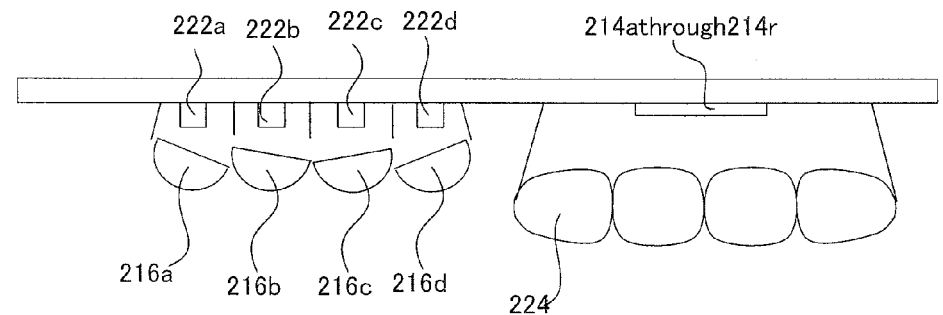
FIG. 12b is a plan view of the sensor according to the third embodiment of the present invention.
Figure 13:
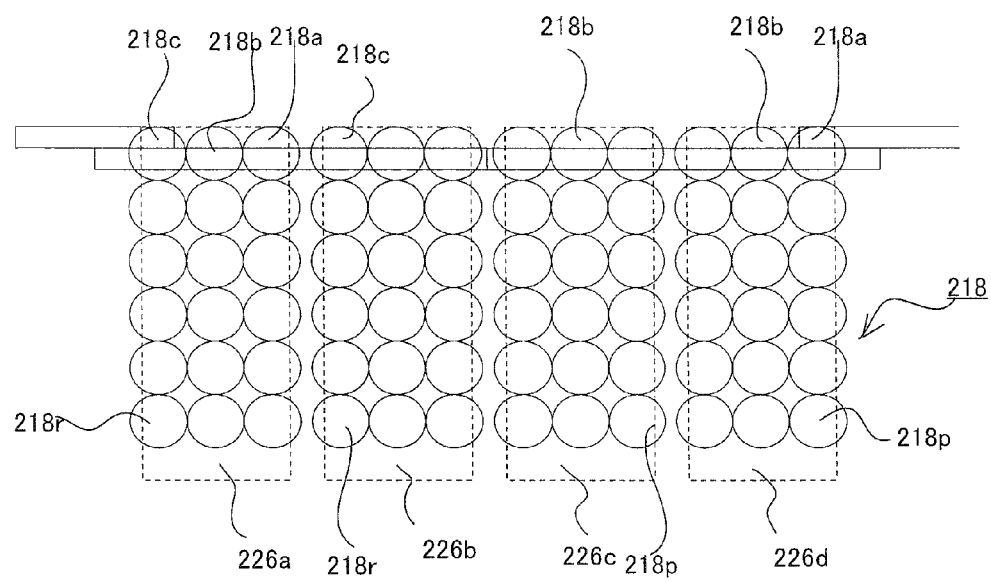
FIG. 13 shows a detecting area formed by the sensor of FIG. 12.

A sensor 2b for use with an automatic door according to a third embodiment of the invention is shown in FIGS. 12a through 16. As shown in FIGS. 12a and 12b, the automatic door sensor 2b includes plural, e.g. eighteen, spotlight projecting light-emitters 214a through 214r arranged in a matrix of three along the width of the door opening by six along the height of the door panels 10, 10. A segmented lens 224 similar to the segmented lenses 24a and 24b of the automatic door sensor 2 is disposed in front of the light-emitter matrix, whereby a light-emitting unit is provided. With this light-emitting unit, four composite projected-light regions 218, each including eighteen, in total, projected-light regions 218a through 218r arranged in a matrix of three in the direction along the width of the door opening by six in the direction perpendicular to the width of the door opening, are formed along the width of the door opening, as shown in FIG. 13.

Also, as shown in FIGS. 12a and 12b, a light-receiving unit is formed by four planar light-receivers 222a through 222d, and four lenses 216a through 216d disposed as optical devices in front of the respective light-receivers. The planar light-receiver may be formed by arranging a plurality of light-receivers of smaller diameter. The light-receivers 222a-222d have a planar shape with a longer dimension extending along the height of the door panels 10, 10, and are disposed in a line along the width of the door opening. Four received-light regions 226a through 226d covering the respective four composite projected-light regions 218, as shown in FIG. 13, are formed by appropriately adjusting the orientation and tilting of the lenses 216a-216d.

Figure 14:
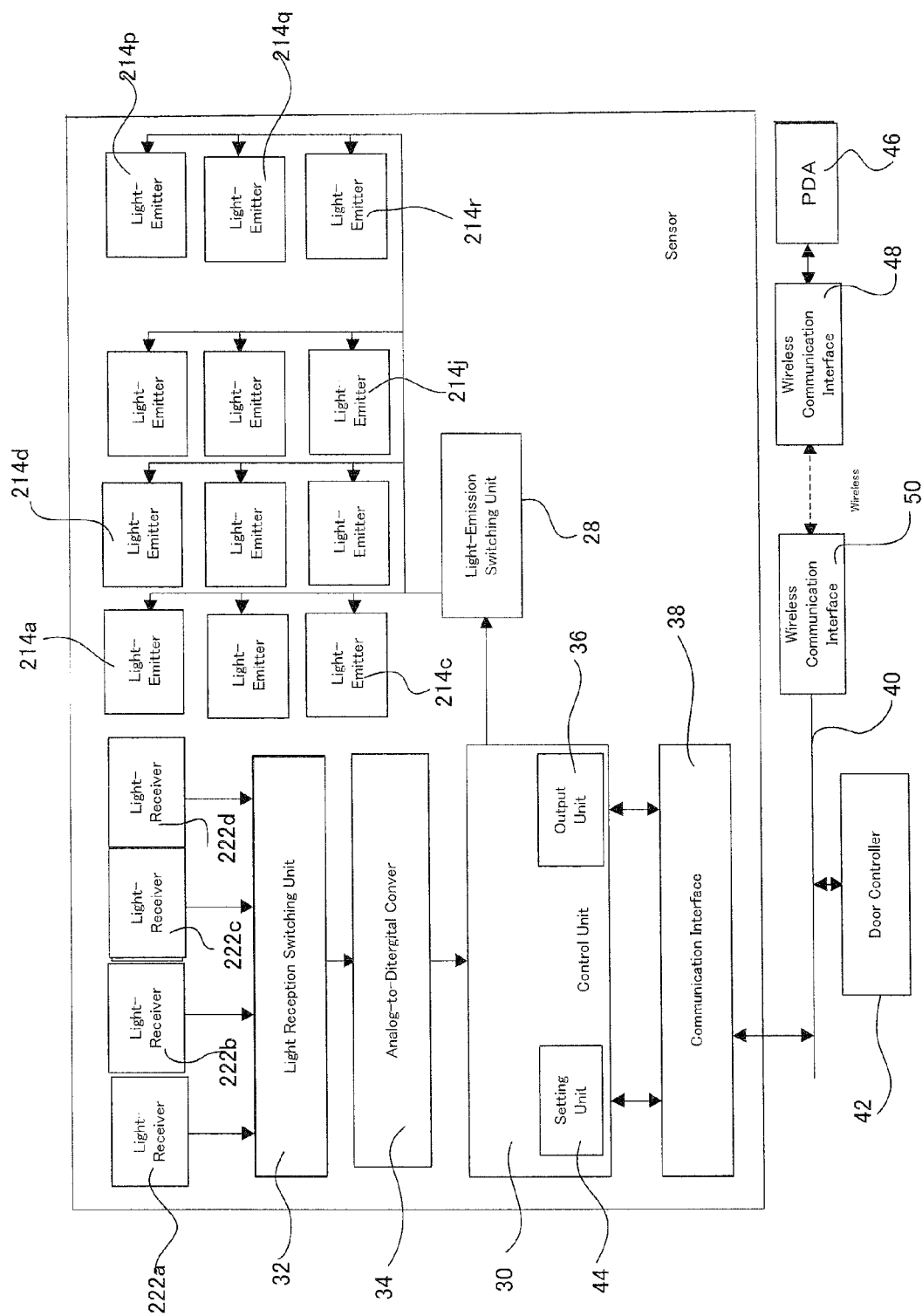
FIG. 14 is a block diagram of the sensor of FIG. 12.

FIG. 14 is a block diagram of the automatic door sensor 2b, in which the same reference numerals and symbols are attached to portions and components same as those used in the circuit of the automatic door sensor 2 and their description is not given.

Figure 15:
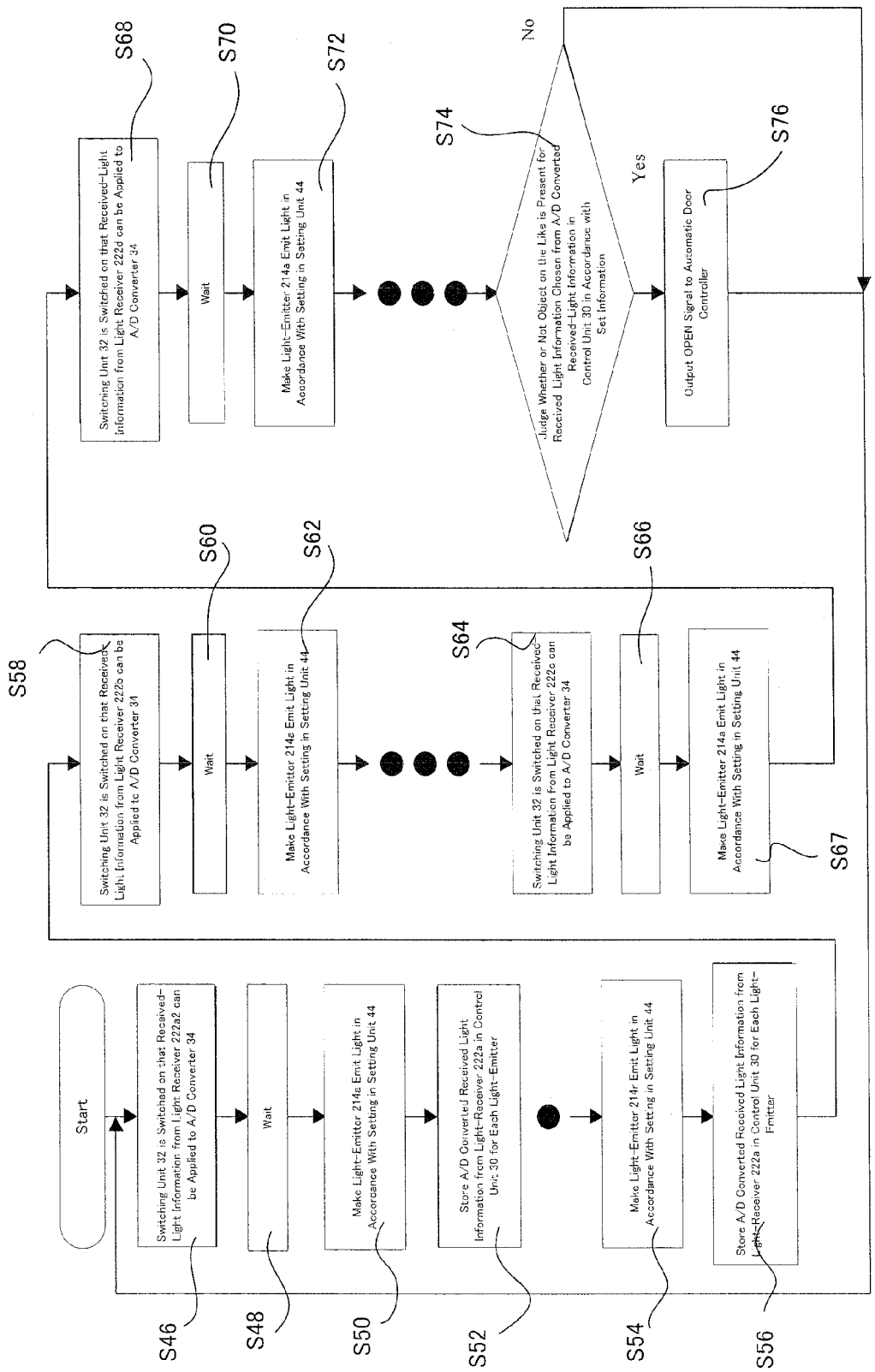
FIG. 15 is a flow chart relating to light emission and light reception in the sensor of FIG. 12.

The control done by the control unit 30 of the automatic sensor 2b is as shown in FIG. 15. First, the control unit 30 sees the setting in the setting unit 44 and switches the light-reception switching unit 32 to make it ready to receive, from the analog-to-digital converter 34, received-light information from the light-receiver 222a (Step S46). Then, waiting until the received-light information becomes stable or until influence of switching noise disappears is had (Step S48), and a switching command is given to the light-emission switching unit 28 to make the light-emitter 214a emit light in accordance with the setting in the setting unit 44 (Step S50). Then, the digital received-light information resulting from the analog-to-digital conversion of the received-light information from the light-receiver 222a is stored in the control unit 30 as the information for the light-emitter 214a (Step S52). Thereafter, in a similar manner, each of the light-emitters 214b-214q is made to emit light, and the digital received-light information resulting from the analog-to-digital conversion of each received-light information is stored for the light-receiver 222a in the control unit 30. Last, the light-emitter 214r is made to emit light (Step S54), and the digital received-light information resulting from the analog-to-digital conversion is stored in the control unit 30 for the light-receivers 222a (Step S56).

Subsequent to Step S56, the setting in the setting unit 44 is seen, and the light-reception switching unit 32 is switched so that the received-light information from the light-receiver 222b can be inputted through the analog-to-digital converter 34 (Step S58). Then, waiting is had until the received-light information becomes stable (Step S60), and a command is given to switch the light-emission switching unit 28 to make the light-emitter 214a emit light (Step S62). After that, in a similar manner, the digital received-light information resulting from the analog-to-digital conversion of the received-light information from the light-receiver 222b is stored in the control unit 30 for the light-receiver 222b, and similar processing is carried out for the remaining light-emitters 214b through 214r.

After that, the setting in the setting unit 44 is seen, and the light-reception unit 32 is switched so that the received-light information from the light-receiver 222c can be inputted through the analog-to-digital converter 34 (Step S64). Then, waiting is had until the received-light information is stabilized (Step S66), and the light-emission switching unit 28 is ordered to make the light-emitter 214a emit light in accordance with the setting in the setting unit 33 (Step S67). After that, in a similar manner, digital received-light information for the light-emitters 214a through 214r is successively stored in the control unit 30.

Thereafter, the setting in the setting unit 44 is seen, and the light-reception switching unit 32 is switched so that the received-light information from the light-receiver 222d can be inputted through the analog-to-digital converter 34 (Step S68). After that, waiting is made for the time period necessary for received-light information to become stable (Step S70), and make the light-emitter 214a emit light in accordance with the setting in the setting unit 44 (Step S72). After that, in a manner similar, the digital received-light information for the light-emitters 214a through 214r is successively stored in the control unit 30.

Figure 16:
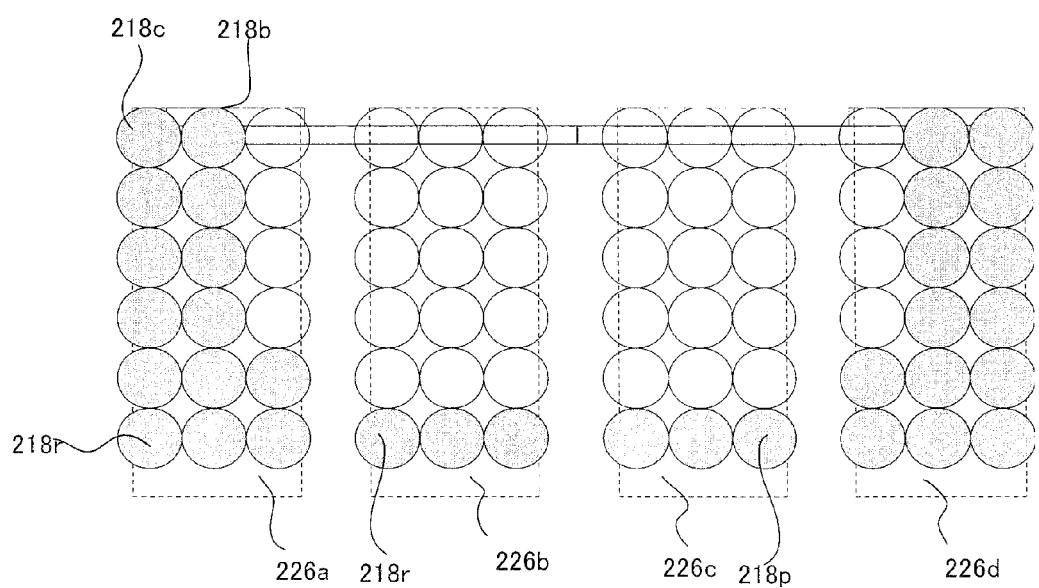
FIG. 16 shows a modified detecting area formed by the sensor of FIG. 12.

Next, the received-light information chosen in accordance with the set information in the setting unit 44 from the digital received-light information for the respective light-emitters 214a-214r stored in the control unit 30 in association with the respective light-receivers 222a-222d is compared with the threshold value to judge whether or not an object or the like is present (Step S74). If the answer is YES, an OPEN signal is outputted to the door controller 42 (Step S76). This causes the door panels 10, 10 to open, and the processing is executed from Step S46 again. In case that the answer in Step S74 is NO, the processing is also executed from Step S46 again. Accordingly, by setting, for example, the system such that the received-light information from part of the received-light regions in the projected-light regions 226b and 226c, as shown in FIG. 16, is not compared with the threshold value, fine area setting corresponding to the passage situation is possible. Further, since the light-emitters are made to emit light successively only after the light-receiving unit is made ready to receive light, the total number of times of switching the analog-to-digital converter 34 is smaller. As a result, the total waiting time period of the light-receiving unit (i.e. the sum of the time periods in each of which influence of switching noise may disappear) can be shorter than in the automatic door sensor 2.

It should be noted that the processing shown in FIG. 6 for the automatic door sensor 2 according to the first embodiment can be employed for the automatic door sensor 2b, after making modifications of cancelling the steps of seeing the setting unit as to whether the respective light-emitters are ready for emitting light, as exemplified by Steps S2, S24, S34 and S36, and making all of the light-emitters emit light successively.

Figure 17A:
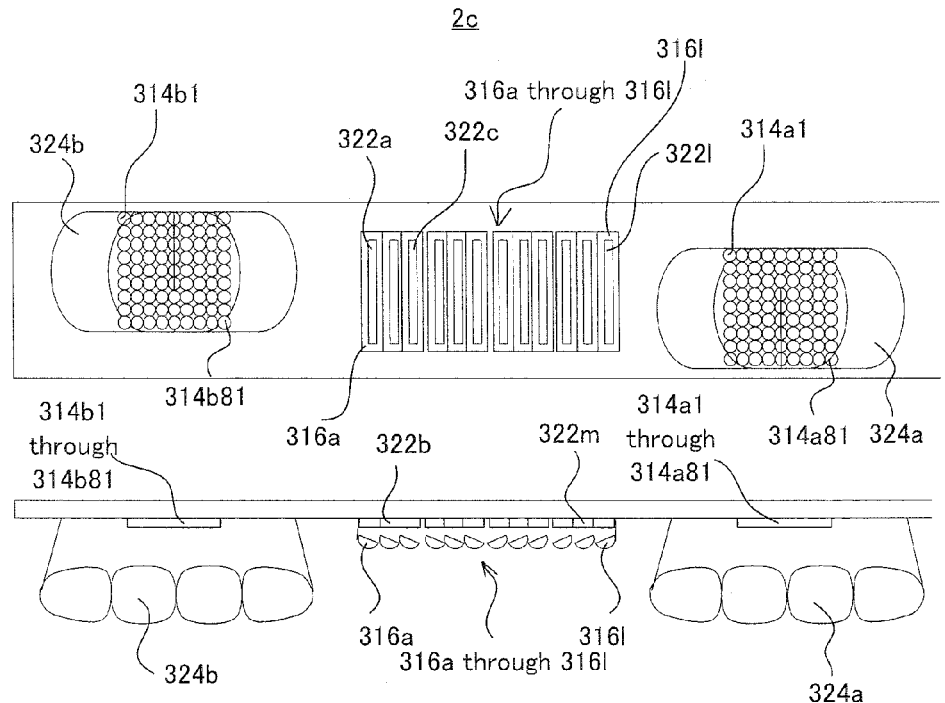
FIG. 17a is a front view of a sensor for use with an automatic door according to a fourth embodiment of the present invention.
Figure 17B:
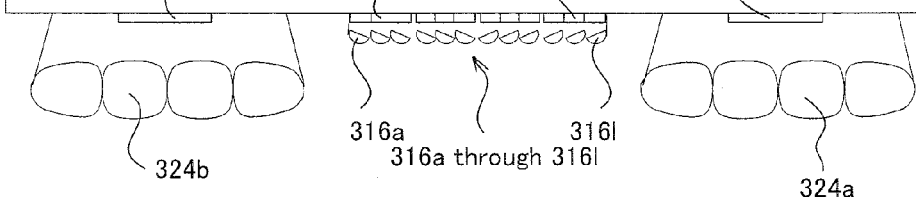
FIG. 17b is a plan view of the sensor according to the fourth embodiment of the present invention.
Figure 18:
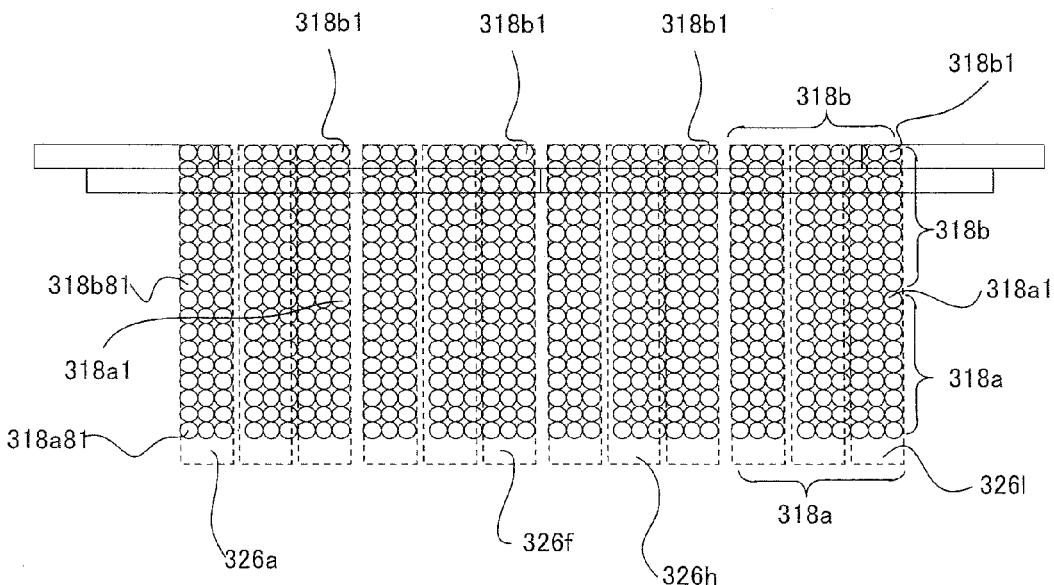
FIG. 18 shows a detecting area formed by the sensor of FIG. 17.

An automatic door sensor 2c according to a fourth embodiment of the invention is shown in FIGS. 17a through 18. The automatic door sensor 2c is a modification of the automatic door sensor 2b according to the third embodiment in which the light-emitting unit is disposed on each of opposite sides of the light-receiving unit. Each light-emitting unit includes eighty-one (81) in total of light-emitters 314a1 through 314a81, 314b1 through 314b81 arranged in a matrix of nine along the width of the door opening by nine in the direction perpendicular to the width of the door opening, e.g. along the height of the door panels 10, 10 in case that the sensor 2c is installed on the lintel. The set of light-emitters 314a1-314a81 and the set of the light-emitters 314b1-314b81 are displaced relative to each other in the vertical direction in FIG. 17a, or, in other words, displaced from each other in the direction along the height of the door panels 10, 10 in case that the sensor 2c is mounted on the lintel, so that the projected-light regions do not overlap with each other. With this disposition, four composite projected-light regions 318a, 318b are formed along the width of the door opening, each being formed by one hundred and sixty-two (162) in total of projected-light regions 318a1 through 318a81 and 318b1 through 318b81, as shown in FIG. 18.

The light-receiving unit includes twelve light-receivers 322a through 322l arranged along the width of the door opening. Each of the light-receivers is planar with its longer side extending in the direction perpendicular to the width of the door opening, i.e. along the height of the door panels 10, 10 in case that the sensor 2c is mounted on the lintel, for example. In front of the light-receivers 322a-322l, twelve lenses 316a through 316l are disposed, as optical devices, in association with the respective ones of the light-receivers 322a-322l. With this arrangement, a total of twelve received-light regions 326a through 326l are formed being arranged along the width of the door opening, as shown in FIG. 18. The orientation and tilting of the lenses 316a-316l are adjusted in such a manner that each of the received-light regions 326a-326l can include therein a matrix of 3×18 projected-light regions, three in the direction along the width of the door opening by eighteen in the direction perpendicular to the width of the door opening.

The circuit arrangement of the automatic door sensor 2c is the same as the block diagram shown in FIG. 4 except for the number of the light-receivers and light-emitters, and, therefore its detailed description is not given. The automatic door sensor 2c operates in a manner similar to the automatic door sensor 2, and, therefore its description is not given. Since the automatic door sensor 2c uses a large number of light-emitting devices and a large number of light-receiving devices, it can detect a human or object with high resolution, and, also, the sum of the waiting times (i.e. the sum of the time periods in which influence of switching noise may disappear) is short as in the case of the automatic door sensor 2b. Accordingly, even though it uses a large number of light-emitters, the time required by the sensor 2c for detecting the presence of a human or object does not become longer.

Figure 19A:
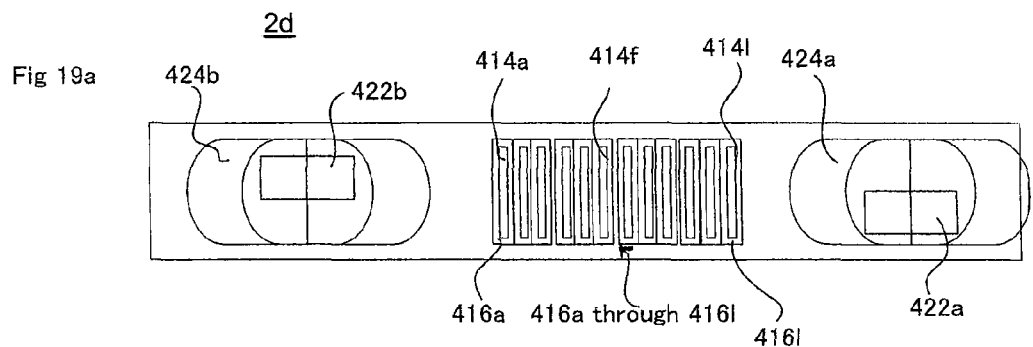
FIG. 19a is a front view of a sensor for use with an automatic door according to a fifth embodiment of the present invention.
Figure 19B:
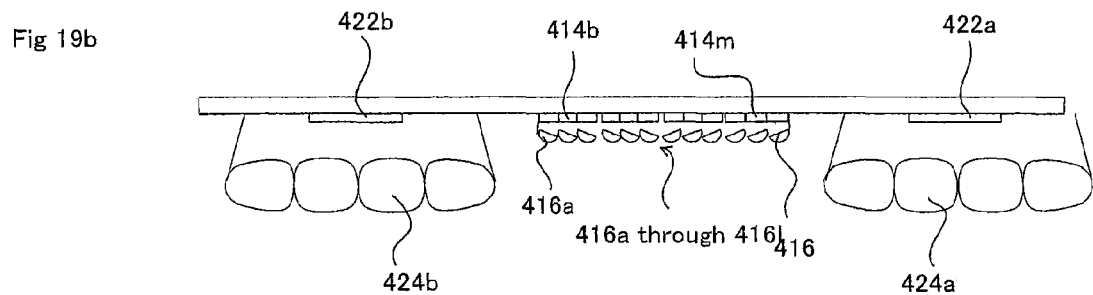
FIG. 19b is a plan view of the sensor according to the fifth embodiment of the present invention.
Figure 20:
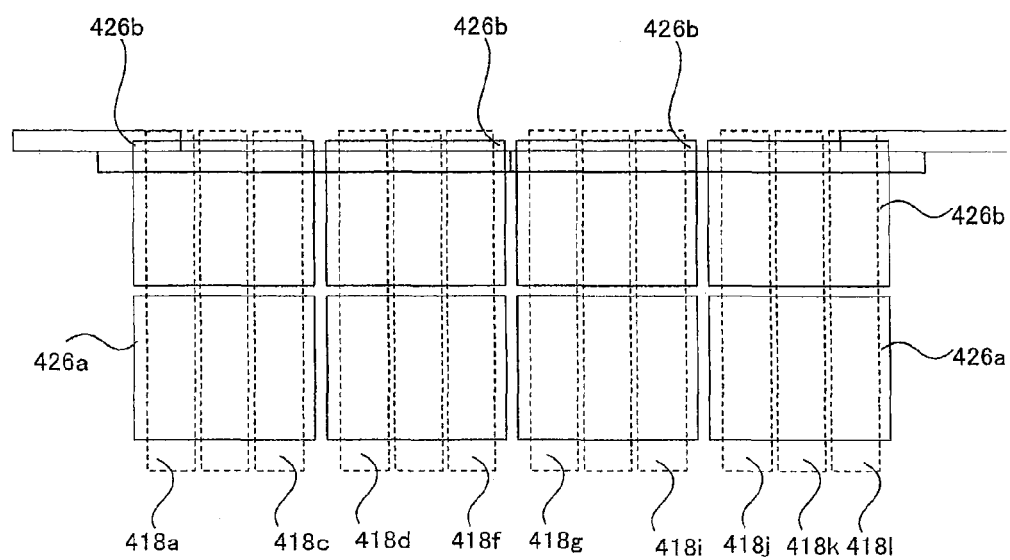
FIG. 20 shows a detecting area formed by the sensor of FIG. 19.

A sensor 2d for use with an automatic door according to a fifth embodiment is shown in FIGS. 19a through 20. The automatic door sensor 2d includes a light-emitting unit in its center and light-receiving units on opposite sides of the light-emitting unit, as the automatic door sensor 2 according to the first embodiment. As in the first embodiment, the light-emitting unit includes plural planar light-emitters, e.g. twelve light-emitters 414a through 411l arranged along the width of the door opening, with their longer sides extending in the direction perpendicular to the width of the door opening. In front of them, lenses 416a through 416l, acting as the optical devices, are disposed. With this arrangement, as shown in FIG. 20, a total of sixteen projected-light regions 418a through 418l are formed being arranged along the width of the door opening. The projected-light regions 418a-418l are formed on the floor with their longer sides extending perpendicular to the width of the door opening.

The light-receiving unit includes planar light-receivers 422a and 422b, which are arranged to have their longer sides extending horizontal or in the direction along the width of the door opening in such a manner as not to overlap with each other. Four-segmented lenses 424a and 424b are disposed in front of the light-receivers 422a and 422b, like the segmented lenses 24a and 24b. With this arrangement, the light-receiver 422b provides four received-light regions 426b formed along the width of the door opening at locations near the door opening, and the light-receiver 422a provides four received-light regions 426a formed along the width of the door opening at locations remote from the door opening. Within these received-light regions 426a and 426b, projected-light regions 418a through 418l are formed, which overlap with each other.

The circuit arrangement of the automatic door sensor 2d is the same as shown in the block diagram in FIG. 4, except for the numbers of the light-receivers and light-emitters, and, therefore its detailed description is not given. The automatic door sensor 2d operates in a manner similar to the automatic door sensor 2, except for the numbers of the light-receivers and light-emitters, and, therefore the description of its operation is not given.

Figure 21A:
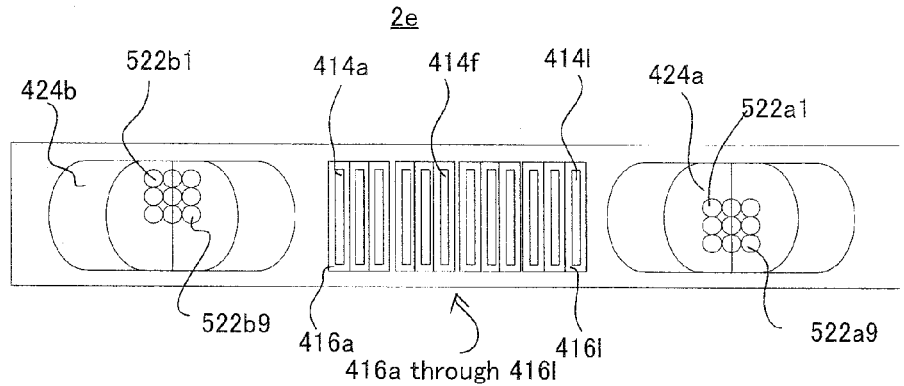
FIG. 21a is a front view of a sensor for use with an automatic door according to a sixth embodiment of the present invention.
Figure 21B:
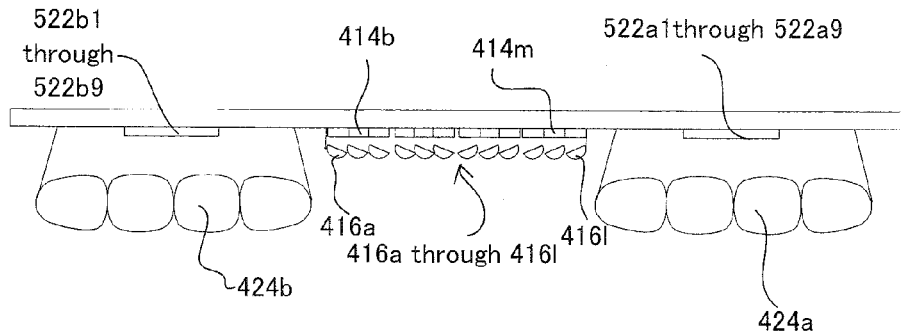
FIG. 21b is a plan view of the sensor according to the sixth embodiment of the present invention.
Figure 22:
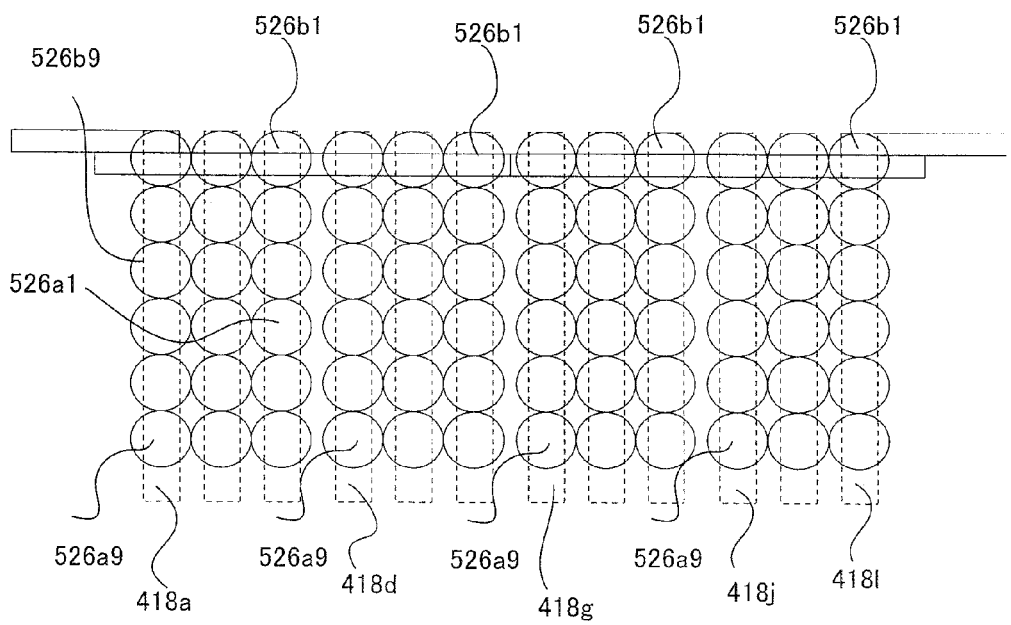
FIG. 22 shows a detecting area formed by the sensor of FIG. 21.

A sensor 2e for use with an automatic door according to a sixth embodiment is shown in FIGS. 21a through 22. This automatic door sensor 2e is similarly arranged to the automatic door sensor 2d, except for the arrangement of two light-receiving units. The same reference numerals and symbols are attached to equivalent portions, and a description of the equivalent portions is not given. The light-receiving units each include nine spotlight receiving light-receivers 522a1 through 522*a*9, 522*b*1 through 522*b*9, in place of the planar light-receivers. The nine light-receivers are arranged in a matrix of three arranged along the width of the door opening by three arranged along the height of the door panels 10, 10. The light-receivers 522*a*1-522*a*9 and 522*b*1-522*b*9 and the segmented lenses 424*a* and 424*b* disposed in front of the respective matrices provide four matrices of circular received-light regions 526*a*1 through 526*a*9 and 526*b*1 through 526*b*9, arranged on the floor along the width of the door opening, as shown in FIG. 22. Each matrix includes three received-light regions along the width of the door opening by six in the direction perpendicular to the width of the door opening. The orientation and tiling of the segmented lenses 424*a* and 424*b* are adjusted to provide the received-light regions 526*a*1-526*a*9 and 526*b*1-526*b*9 arranged in such a manner that six received-light regions can be disposed overlapping with each other in each of the projected-light regions 418*a* through 418*l*.

The circuit arrangement of the automatic door sensor 2*e* is the same as shown in the block diagram in FIG. 4, except for the numbers of the light-receivers and light-emitters, and, therefore its detailed description is not given. The automatic door sensor 2*e* operates in a manner similar to the automatic door sensor 2, except for the numbers of the light-receivers and light-emitters, and, therefore the description of its operation is not given. By operating this automatic door sensor 2*e* in a similar manner to the automatic door sensor 2*b*, the sum of the waiting times (i.e. the sum of the time periods in which influence of switching noise may disappear) can be made short. Accordingly, even though it uses a large number of light-emitters, the time required by the sensor 2*e* for detection does not become longer.

Figure 23A:
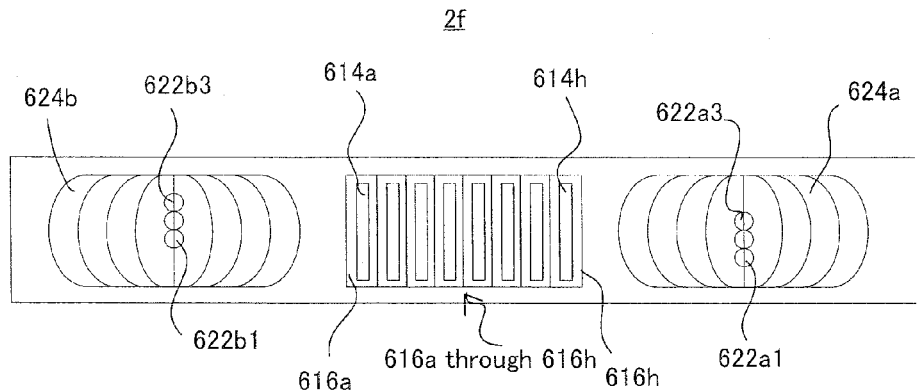
FIG. 23a is a front view of a sensor for use with an automatic door according to a seventh embodiment of the present invention.
Figure 23B:
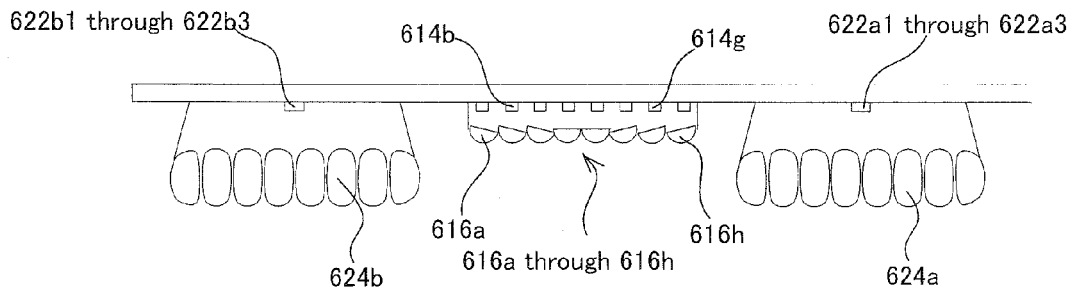
FIG. 23b is a plan view of the sensor according to the seventh embodiment of the present invention.
Figure 24:
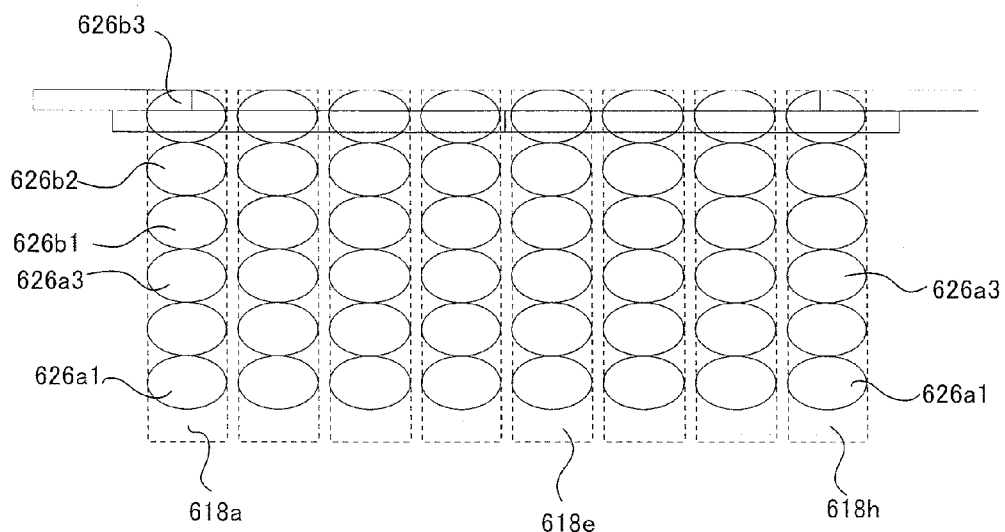
FIG. 24 shows a detecting area formed by the sensor of FIG. 23.

A sensor 2*f* for use with an automatic door according to a seventh embodiment of the invention is shown in FIGS. 23*a* through 24. The automatic door sensor 2*f* is provided with eight light-emitters 614*a* through 614*h* in a light-emitting unit, and lenses 616*a* through 616*h* acting as optical devices disposed in front of the respective light-emitters 614*a*-614*h*. This arrangement provides eight projected-light regions 618*a* through 618*h* disposed along the door opening as shown in FIG. 24. Two light-emitting units each include a set of three light-receivers 622*a*1 through 622*a*3 and 622*b*1 through 622*b*3 arranged in a line. The light-receivers 622*a*1-622*a*3 and the light-receivers 622*b*1-622*b*3 are displaced from each other in the vertical direction in the drawing, i.e. along the height of the door panels 10, 10 in case the sensor 2*f* is mounted on the lintel, so that the received-light regions do not overlap with each other. Segmented lenses 624*a* and 624*b* are disposed in front of the respective sets of light-receivers. The segmented lenses 624*a* and 624*b* are segmented into eight, corresponding to the number of the light-emitters 614*a*-614*h*. The segmented lenses 624*a* and 624*b* have their orientation and tilting so adjusted that the received-light regions 626*a*1-626*a*3 and 626*b*1-626*b*3 formed by the light-receivers 622*a*1-622*a*3 and 622*b*1-622*b*3 overlap within the respective projected-light regions 618*a*-618*h*. The circuit arrangement of the automatic door sensor 2*f* is the same as shown in the block diagram in FIG. 4, except for the numbers of the light-receivers and light-emitters, and, therefore its detailed description is not given. The automatic door sensor 2*f* operates in a manner similar to the automatic door sensor 2, except for the numbers of the light-receivers and light-emitters, and, therefore the description of its operation is not given. By operating this automatic door sensor 2*f* in a similar manner to the automatic door sensor 2*b*, the sum of the waiting times (i.e. the sum of the time periods in which influence of switching noise may disappear) can be made short. Accordingly, even though it uses a large number of light-emitters, the time required by the sensor 2*f* for detection does not become longer.

Figure 25A:
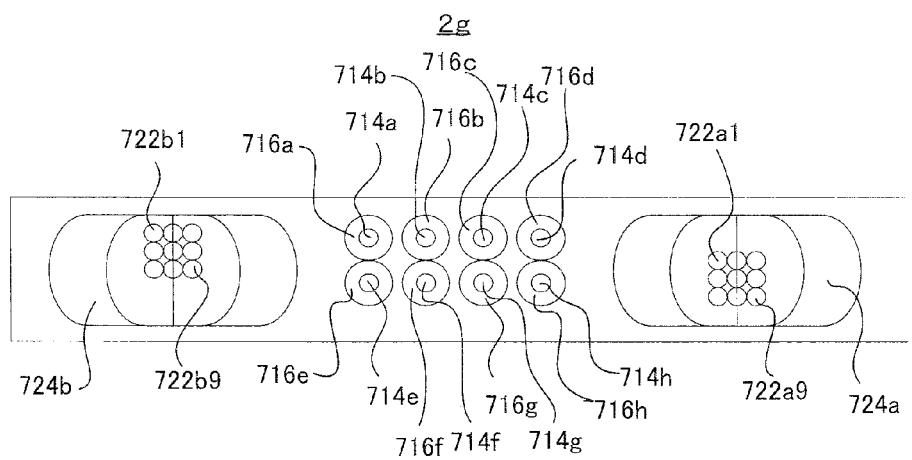
FIG. 25a is a front view of a sensor for use with an automatic door according to an eighth embodiment of the present invention.
Figure 25B:
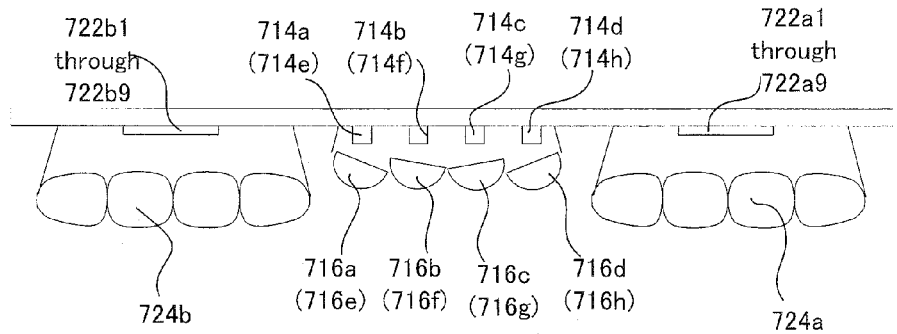
FIG. 25b is a plan view of the sensor according to the eighth embodiment of the present invention.
Figure 26:
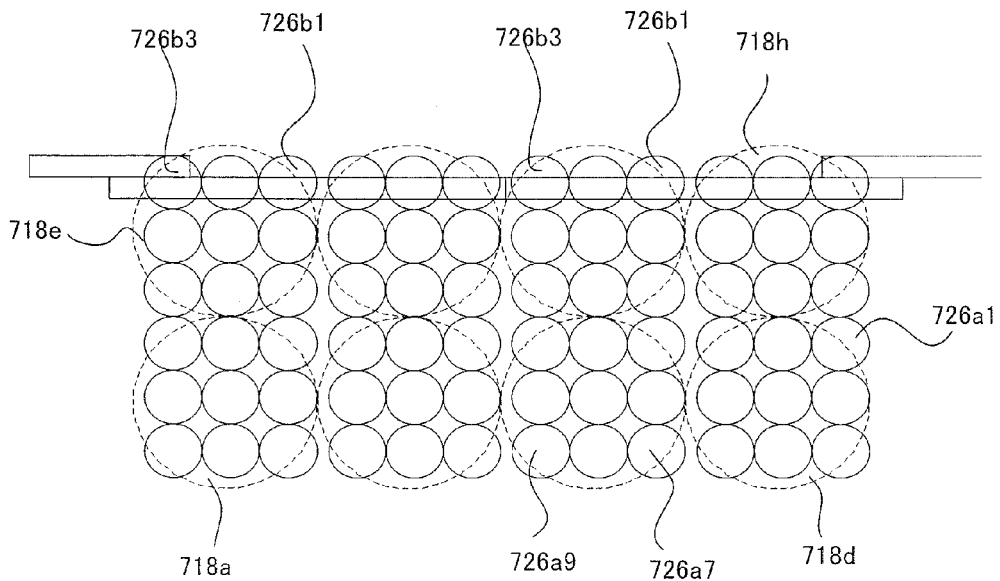
FIG. 26 shows a detecting area formed by the sensor of FIG. 25.

A sensor 2*g* for use with an automatic door according to an eighth embodiment is shown in FIGS. 25*a* through 26. The automatic door sensor 2*g* includes a light-emitting unit having eight spotlight-projecting light-emitters 714*a* through 714*h* which are arranged in a matrix of four along the width of the door opening by two in the direction perpendicular to the door opening, e.g. along the height of the door panels 10, 10 in case that the sensor 2*g* is mounted on the lintel. Lenses 716*a* through 716*h* are disposed in front of the respective light-emitters 714*a*-714*h*, whereby, as shown in FIG. 26, eight circular projected-light regions 718*a* through 718*h* are formed on the floor in a matrix of four along the width of the door opening by two in the direction perpendicular to the width of the door opening.

Two light-receiving units on opposite sides of the light-emitting unit include two light-receiver matrices each including nine spotlight receiving light-receivers 722*a*1 through 722*a*9, 722*b*1 through 722*b*9. Each matrix includes three light-receivers disposed along the width of the door opening by three in the direction perpendicular to the width of the door opening, e.g. in the direction along the height of the door panels 10, 10 in case the sensor 2*g* is mounted on the lintel. The two matrices are displaced from each other in the direction perpendicular to the width of the door opening, e.g. in the direction along the height of the door panels 10, 10 in case the sensor 2*g* is mounted on the lintel. Segmented lenses 724*a* and 724*b* are disposed in front of the matrix of nine light-receivers 722*a*1-722*a*9 and the matrix of nine light-receivers 722*b*1-722*b*9, respectively, so that nine received-light regions 726*a*1 through 726*a*9 and nine received-light regions 726*b*1 through 726*b*9 in matrices of three along the width of the door opening by three in the direction perpendicular to the width of the door opening can be formed in each of the projected-light regions 718*a*-718*h*. The circuit arrangement of the automatic door sensor 2*g* is the same as shown in the block diagram in FIG. 4, except for the numbers of the light-receivers and light-emitters, and, therefore its detailed description is not given. The automatic door sensor 2*g* operates in a manner similar to the automatic door sensor 2, except for the numbers of the light-receivers and the light-emitters, and, therefore the description of its operation is not given. By operating this automatic door sensor 2*g* in a similar manner to the automatic door sensor 2*b*, the sum of the waiting times (i.e. the sum of the time periods in which influence of switching noise may disappear) can be made short. Accordingly, even though it uses a large number of light-emitters, the time required by the sensor 2*g* for detection does not become longer.

Figure 27A:
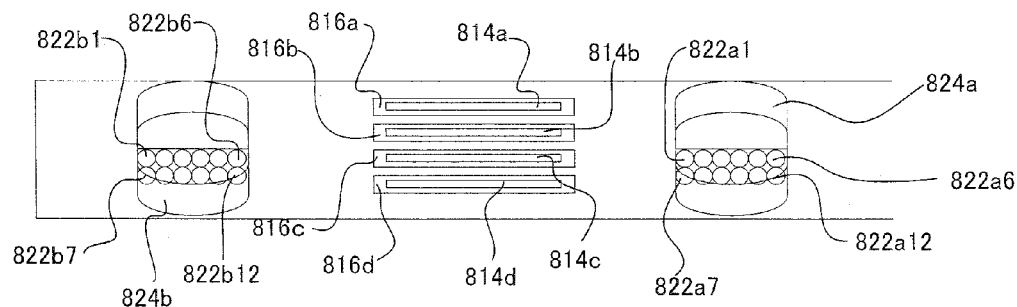
FIG. 27a is a front view of a sensor for use with an automatic door according to a ninth embodiment of the present invention.
Figure 27B:
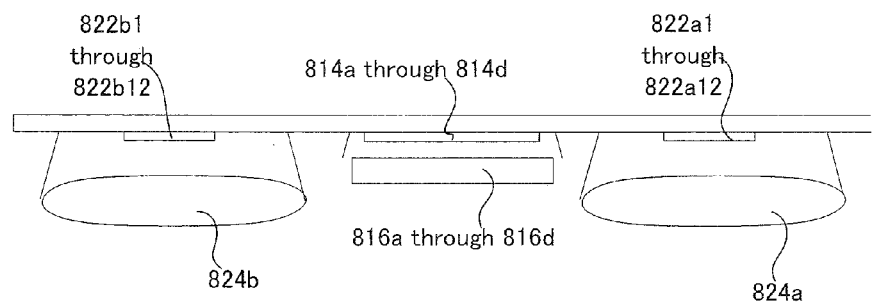
FIG. 27b is a plan view of the sensor according to the ninth embodiment of the present invention.
Figure 28:
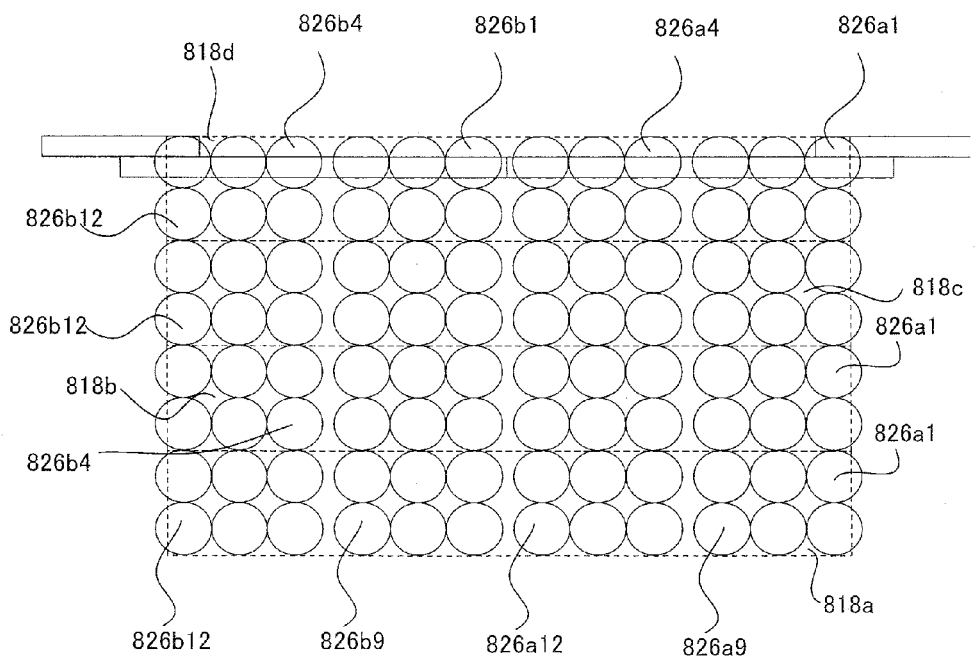
FIG. 28 shows a detecting area formed by the sensor of FIG. 27.

A sensor 2*h* for use with an automatic door according to a ninth embodiment of the invention is shown in FIGS. 27*a* through 28. The automatic door sensor 2*h* includes a light-emitting unit having four planar light-emitters 814*a* through 814*d*. The light-emitters 814*a*-814*d* are arranged along the height of the door panels 10, 10 with their longer sides extending along the width of the door opening. Lenses 816*a* through 816*d*, acting as optical devices, are disposed in front of the respective light-emitters 814*a*-814*d*. This arrangement provides, as shown in FIG. 28, rectangular projected-light regions 818*a* through 818*d* on the floor, which are arranged in the direction perpendicular to the width of the door opening with their longer sides extending along the width of the door opening.

Two light-receiving units each have twelve spotlight receiving light-receivers 822*a*1 through 822*a*12, 822*b*1 through 822*b*12, in matrices of six along the width of the door opening by two in the direction perpendicular to the width of the door opening, e.g. in the direction along the height of the door panels 10, 10 in case that the sensor 2*h* is mounted on the lintel. The light-receiving units are disposed on opposite sides of the light-emitting unit. Segmented lenses 824*a* and 824*b* are disposed in front of the respective sets of light-receivers 822*a*1-822*a*12 and 822*b*1-822*b*12. The segmented lenses 824*a* and 824*b* are segmented into four segments to disperse light in the direction perpendicular to the door opening, e.g. in the direction along the height of the door panels 10, 10 in case that the sensor 2*h* is mounted on the lintel. With this arrangement, a set of received-light regions 826*a*1-826*a*12 formed by the light-receivers 822*a*1-822*a*12 and received-light regions 826*b*1-826*b*12 formed by the light-receivers 822*b*1-822*b*12 is disposed in each of the projected-light regions 818*a*-818*d*.

The circuit arrangement of the automatic door sensor 2*h* is the same as shown in the block diagram in FIG. 4, except for the numbers of the light-receivers and light-emitters, and, therefore its detailed description is not given. The automatic door sensor 2*h* operates in a manner similar to the automatic door sensor 2, except for the numbers of light-receivers and light-emitters, and, therefore the description of its operation is not given. By operating this automatic door sensor 2*h* in a similar manner to the automatic door sensor 2*b*, the sum of the waiting times (i.e. the sum of the time periods in which influence of switching noise may disappear) can be made short. Accordingly, even though it uses a large number of light-emitters, the time required by the sensor 2*h* for detection does not become longer.

Figure 29A:
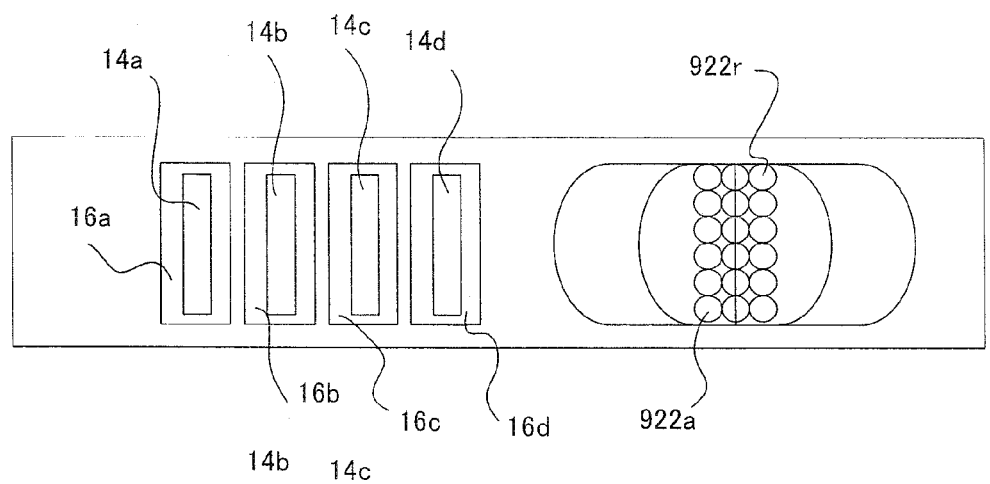
FIG. 29a is a front view of a sensor for use with an automatic door according to a tenth embodiment of the present invention.
Figure 29B:
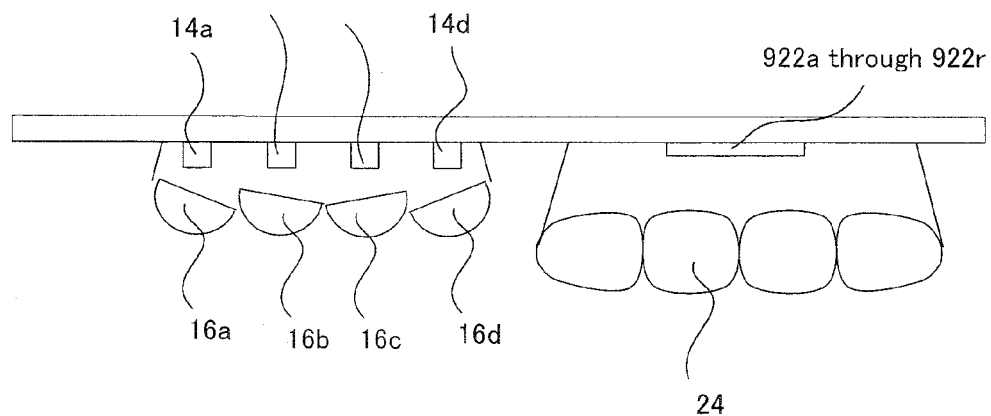
FIG. 29b is a plan view of the sensor according to the tenth embodiment of the present invention.

A sensor 2*i* for use with an automatic door according to a tenth embodiment of the invention is shown in FIGS. 29*a* and 29*b*. The automatic door sensor 2*i* is the same as the automatic door sensor 2 according to the first embodiment, with modifications of using only one light-receiving unit and, instead, using eighteen light-receivers 922*a* through 922*r* arranged in a matrix of three along the width of the door opening by six in the direction perpendicular to the width of the door opening, e.g. along the height of the door panels 10, 10 in case that the automatic door sensor 2*i* is mounted on the lintel. The remaining arrangement is the same as the automatic door sensor 2 and, therefore the same reference numerals and symbols are attached to the same components, with no description given. With this arrangement, similar projected-light and received-light regions to those shown in FIG. 3 are provided.

Figure 30A:
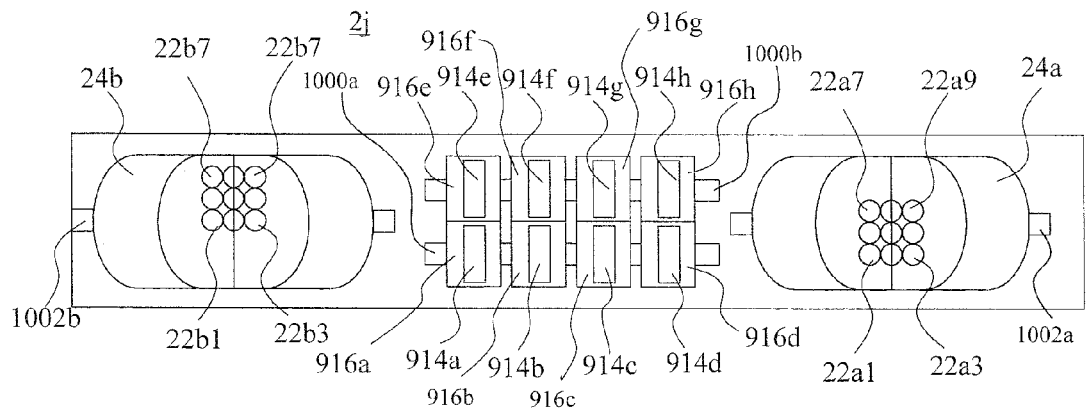
FIG. 30a is a front view of a sensor for use with an automatic door according to an eleventh embodiment of the present invention.
Figure 30B:
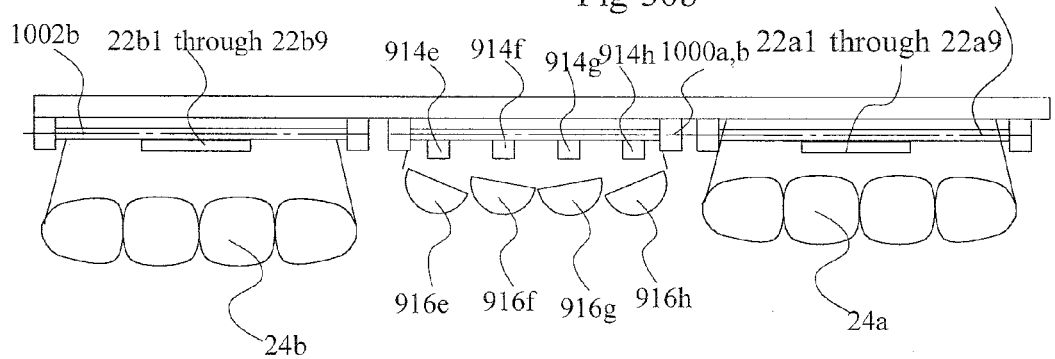
FIG. 30b is a plan view of the sensor according to the eleventh embodiment of the present invention.
Figure 31:
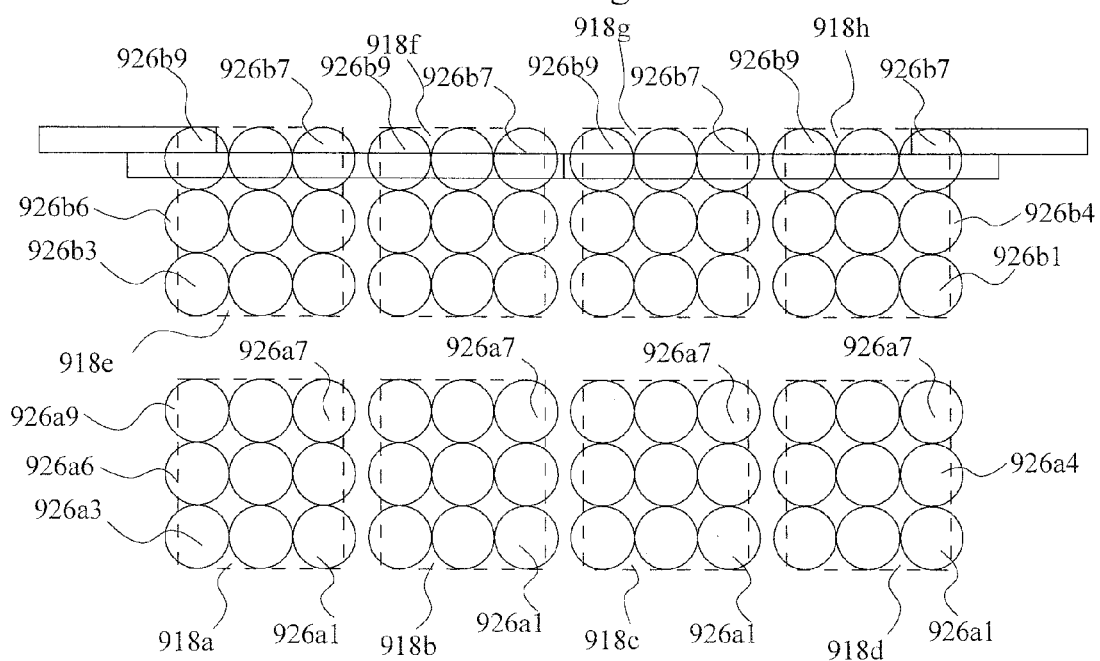
FIG. 31 shows a detecting area formed by the sensor of FIG. 30.

A sensor 2*j* for use with an automatic door according to an eleventh embodiment of the invention is shown in FIGS. 30*a* through 31. As shown in FIG. 30*a*, the automatic door sensor 2*j* includes a light-emitting unit having plural, e.g. eight, light-emitters 914*a* through 914*h* arranged in a matrix of four along the width of the door opening by two in the direction perpendicular to the width of the door opening, e.g. along the height of the door panels 10, 10 in case the automatic door sensor 2*j* is mounted on the lintel. Cylindrical lenses, acting as optical devices, 916*a* through 916*h* are disposed in front of the respective light-emitters. The light-emitters 914*a*-914*d* nearer to the door panels 10, 10 and their associated cylindrical lenses 916*a*-916*d*, and the light-emitters 914*e*-914*h* and their associated cylindrical lenses 916*e*-916*h* are arranged to be rotatable independently from each other about respective rotation shafts 1000*a* and 1000*b* extending horizontally along the width of the door opening, whereby projected-light regions 918*e* through 918*h* provided by the light-emitters 914*e*-914*h* and their associated cylindrical lenses 916*e*-916*h* and projected-light regions 918*a* through 918*d* provided by the light-emitters 914*a*-914*d* and their associated cylindrical lenses 916*a*-916*d* can be independently moved in the direction perpendicular to the width of the door opening. It should be noted that the rotation shaft 1000*b* may be eliminated so that the projected-light regions 918*e*-918*h* are fixed, with the projected-light regions 918*a*-918*d* only be arranged to be movable.

As light-receiving devices, a matrix of nine light-receivers 22*a*1-22*a*9 as used in the automatic door sensor 2 of the first embodiment is disposed on the right side in FIG. 30*a* at a location nearer to the door. On the left side in FIG. 30*a*, a matrix of nine light-receivers 22*b*1-22*b*9 is disposed at a location remote from the door. These light-receiver matrices are displaced from each other in the vertical direction in FIG. 30*a*, e.g. in the direction along the height in case the sensor 2*j* is mounted on the lintel, so that the received-light regions do not overlap with each other. In front of the right-side and left-side light-receivers 22*a*1-22*a*9 and 22*b*1-22*b*9, segmented lenses 24*a* and 24*b* similar to the ones used in the automatic door sensor 2 of the first embodiment are disposed. It should be noted, however, that the light-receivers 22*b*1-22*b*9 and the segmented lens 24*b* are made rotatable about a rotation shaft 1002*b* similar to the rotation shaft 1000*b* in such a manner that the rotation shafts 1000*b* and 1002*b* rotate in synchronism with each other, and that the light-receivers 22*a*1-22*a*9 and the segmented lens 24*a* are made rotatable about a rotation shaft 1002*a* similar to the rotation shaft 1000*a* in such a manner that the rotation shafts 1000*a* and 1002*a* rotate in synchronism with each other. With this arrangement, received-light regions 926*a*1 through 926*a*9 formed in association with the light-receivers 22*a*1-22*a*9 can be in the projected-light regions 918*a*-918*d* even when the projected-light regions 918*a*-918*d* move in the direction perpendicular to the width of the door opening. Similarly, received-light regions 926*b*1 through 926*b*9 formed in association with the light-receivers 22*b*1-22*b*9 can be in the projected-light regions 918*e*-918*h* even when the projected-light regions 918*e*-918*h* move in the direction perpendicular to the width of the door opening.

As described above, since the projected-light regions 918*a*-918*d* and the received-light regions 926*b*1-926*b*9 can be moved in the direction perpendicular to the width of the door opening, the surveillance area can be expanded in the direction perpendicular to the width of the door opening.

The circuit arrangement of the automatic door sensor 2*j* is the same as shown in the block diagram in FIG. 4, except for the numbers of the light-receivers and light-emitters, and, therefore its detailed description is not given. The automatic door sensor 2*j* operates in a manner similar to the automatic door sensor 2, except for the numbers of light-receivers and light-emitters, and, therefore the description of its operation is not given. By operating this automatic door sensor 2*j* in a similar manner to the automatic door sensor 2*b*, the sum of the waiting times (i.e. the sum of the time periods in which influence of switching noise may disappear) can be made short. Accordingly, even though it uses a large number of light-emitters, the time required by the sensor 2*j* for detection does not become longer.

The invention claimed is:

1. A sensor for use with an automatic door, comprising:
a light-emitting unit including a plurality of light-emitters cyclically emitting and projecting light to a surveillance area near the door, and an optical device deflecting said light emitted by said light-emitters in the direction along the width of an opening of said door and in a direction perpendicular to the width of said door opening;
a light-receiving unit including a light-receiver receiving light projected to said surveillance area, and a segmented lens including a combination of a plurality of lenses, said segmented lens being disposed to condense light projected to said surveillance area to said light-receiver;

a setting unit in which whether each of said light-emitters should be made to emit light or not is set for each of said light-emitters; and a control unit judging whether or not a human or an object is present in said surveillance area, based on how said light-receiver receives light.

2. The sensor according to claim 1, wherein a plurality of said light-receiver is disposed at least along the width of said door; and whether or not how said light-receiver receives light should be used in determining the presence of a human or an object in said surveillance area is set in said setting unit in accordance with the way how each of said light-emitters emits light.

3. The sensor according to claim 2, wherein three or more of said light-emitters are used.

4. The sensor according to claim 2, wherein a blocking plate is disposed between adjacent ones of said light-emitters.

5. The sensor according to claim 2, wherein said plurality of light-receivers are arranged at least along the width of said door opening and along the direction perpendicular to the width of said door opening.

6. The sensor according to claim 1, wherein said optical device is any one of a cylindrical lens, a toric lens, an optical system utilizing hologram, a slit and a reflection-type mirror.

7. The sensor according to claim 1, wherein a plurality of said light-receiving unit is used; and surveillance areas in said surveillance area monitored by said respective light-receiving units are arranged in the direction perpendicular to the width of said door opening.

8. The sensor according to claim 1, wherein a plurality of said light-receiver is arranged at least along the width of said door opening; and said light-emitting unit is arranged in such a manner that said plurality of light-emitters can emit and project light within the light receiving width for the segments of said segmented lens.

9. A sensor for use with an automatic door, comprising:

a light-emitting unit including a light-emitter emitting and projecting light to a surveillance area near the door and a segmented lens including a combination of a plurality of segments for dispersing the light from said light-emitter onto said surveillance area;

a light-receiving unit including a plurality of light-receivers receiving light projected onto said surveillance area, and a plurality of lenses for condensing, onto said respective light-receivers, light from the light projected onto said surveillance area in the direction along the width of an opening of said door and in the direction perpendicular to the width of said door opening;

a setting unit setting whether how said light-receivers receive light should be used to determine the presence of a human or an object in said surveillance area; and a control unit judging, in accordance with the setting in said setting unit, whether a human or an object is present in said surveillance area from how said light-receivers receive light.

10. A sensor for use with an automatic door, comprising:

a light-emitting unit including a plurality of light-emitters cyclically emitting and projecting light to a surveillance area near the door, and an optical device deflecting said light emitted by said light-emitters in the direction along the width of an opening of said door or in a direction perpendicular to the width of said door opening;

a light-receiving unit including a plurality of one-dimensionally or two-dimensionally arranged light-receivers so that said light-receivers can receive light projected onto said surveillance area, and a segmented lens including a plurality of lenses combined in a direction perpendicular to the direction in which said projected light is deflected, so that light projected onto said surveillance area can be condensed onto said light-receivers;

a setting unit setting, based on how said respective light-emitters emit light, whether or not a judgment about the presence of a human or an object in said surveillance area by the use of how said respective light-receivers receive light should be made; and a control unit judging, in accordance with the setting in said setting unit, whether a human or an object is present in said surveillance area from how said light-receivers receive light.

11. The sensor according to claim 10, wherein a blocking plate is disposed between adjacent ones of said light-emitters.

12. The sensor according to claim 10, wherein said optical device is any one of a cylindrical lens, a toric lens, an optical system utilizing hologram, a slit and a reflection-type mirror.

13. The sensor according to claim 10, wherein a plurality of said light-receiving unit is used; and surveillance areas in said surveillance area monitored by said respective light-receiving units are arranged in the direction perpendicular to the width of said door opening.

14. The sensor according to claim 13, wherein at least one of said light-receiving units is movable.

15. The sensor according to claim 14, wherein a plurality of said light-emitting unit is used, and an area in which light is emitted is movable in the direction perpendicular to the width of said door opening.

16. A sensor for use with an automatic door, comprising:

a light-emitting unit including a plurality of one-dimensionally or two-dimensionally arranged light-emitters cyclically emitting and projecting light onto a surveillance area near said door, and a segmented lens including a plurality of lenses combined in such a manner as to disperse, toward said surveillance area, light from said light-emitters in the direction along the width of an opening of said door or in the direction perpendicular to the width of said door opening;

a light-receiving unit including a plurality of light-receivers receiving light projected onto said surveillance area, and a plurality of optical devices condensing, onto said respective light-receivers, light from the light projected onto said surveillance area in the direction perpendicular to the direction in which the projected light is dispersed;

a setting unit setting, based on how said respective light-emitters emit light, whether or not a judgment about the presence of a human or an object in said surveillance area by the use of how said respective light-receivers receive light should be made; and a control unit judging, in accordance with the setting in said setting unit, whether a human or an object is present in said surveillance area from how said light-receivers receive light.

* * * * *

UNITED STATES PATENT AND TRADEMARK OFFICE
CERTIFICATE OF CORRECTION

PATENT NO. : 8,450,678 B2
APPLICATION NO. : 12/918411
DATED : May 28, 2013
INVENTOR(S) : Shigeaki Sasaki, Takashi Wada and Kenji Nishigaki Page 1 of 1

It is certified that error appears in the above-identified patent and that said Letters Patent is hereby corrected as shown below:

In the Claims

Column 21, line 15, delete "the way"

Signed and Sealed this
Thirtieth Day of July, 2013

Teresa Stanek Rea
*Acting Director of the United States Patent and Trademark Office*